(12) United States Patent
Moomaw et al.

(10) Patent No.: US 10,797,276 B2
(45) Date of Patent: Oct. 6, 2020

(54) SEALED BIPOLAR BATTERY ASSEMBLY

(71) Applicant: Gridtential Energy, Inc., Santa Clara, CA (US)

(72) Inventors: Daniel Jason Moomaw, Santa Clara, CA (US); Collin Kwok Leung Mui, Mountain View, CA (US)

(73) Assignee: Gridtential Energy, Inc., Santa Clara, CA (US)

( * ) Notice: Subject to any disclaimer, the term of this patent is extended or adjusted under 35 U.S.C. 154(b) by 768 days.

(21) Appl. No.: 15/109,402

(22) PCT Filed: Dec. 30, 2014

(86) PCT No.: PCT/US2014/072804
§ 371 (c)(1),
(2) Date: Jun. 30, 2016

(87) PCT Pub. No.: WO2015/103295
PCT Pub. Date: Jul. 9, 2015

(65) Prior Publication Data
US 2016/0329535 A1  Nov. 10, 2016

Related U.S. Application Data

(60) Provisional application No. 61/921,919, filed on Dec. 30, 2013, provisional application No. 61/921,871, (Continued)

(51) Int. Cl.
*H01M 2/08* (2006.01)
*H01M 2/10* (2006.01)
(Continued)

(52) U.S. Cl.
CPC ............... *H01M 2/08* (2013.01); *B29C 45/14* (2013.01); *B29C 65/08* (2013.01); *B29C 65/18* (2013.01);
(Continued)

(58) Field of Classification Search
CPC ........ H01M 2/08; H01M 2/1016; H01M 4/68; H01M 10/0418; H01M 10/0486;
(Continued)

(56) References Cited

U.S. PATENT DOCUMENTS 4,164,068 A    8/1979  Shropshire et al.
4,275,130 A    6/1981  Rippel et al.
(Continued)

FOREIGN PATENT DOCUMENTS

AU    2014373800 B2    3/2019
CA       2935552 C     7/2019
(Continued)

OTHER PUBLICATIONS

"U.S. Appl. No. 15/197,346, Notice of Allowance dated Jul. 13, 2018", 7 pgs.
(Continued)

*Primary Examiner* — Brittany L Raymond
(74) *Attorney, Agent, or Firm* — Schwegman Lundberg & Woessner, P.A.

(57) ABSTRACT

Apparatus and techniques such as can include a sealed bipolar battery assembly are described herein. For example, the battery assembly can using two or more sealing techniques, such as to provide a liquid-tight assembly. A sealed current collector assembly can be provided, such as by fitting compressible plastic seals to one or both side of a current collector. An adhesive seal can be applied to an edge or perimeter of the current collector. A plastic seal assembly can be used to anchor the seals or to provide an additional layer of leakage protection should electrolyte seep under hydrophobic plastic seals. Current collector assemblies including stackable casing frames can be assembled to
(Continued)

provide a rigid casing. These casing assemblies can be stacked on top of one another to form bipolar cells comprising the battery assembly.

29 Claims, 10 Drawing Sheets

Related U.S. Application Data filed on Dec. 30, 2013, provisional application No. 62/044,601, filed on Sep. 2, 2014, provisional application No. 62/087,024, filed on Dec. 3, 2014.

(51) Int. Cl.

| | | |
|---|---|---|
| H01M 4/68 | (2006.01) | |
| H01M 10/14 | (2006.01) | |
| H01M 10/18 | (2006.01) | |
| B29C 45/14 | (2006.01) | |
| B29C 65/08 | (2006.01) | |
| B29C 65/18 | (2006.01) | |
| H01M 10/04 | (2006.01) | |
| B29L 31/34 | (2006.01) | |

(52) U.S. Cl.
CPC ........... *H01M 2/1016* (2013.01); *H01M 4/68* (2013.01); *H01M 10/0418* (2013.01); *H01M 10/0486* (2013.01); *H01M 10/14* (2013.01); *H01M 10/18* (2013.01); *B29L 2031/3468* (2013.01)

(58) Field of Classification Search
CPC ....... H01M 10/14; H01M 10/18; B29C 45/14; B29C 65/08; B29C 65/18; B29L 2031/3468
See application file for complete search history.

(56) References Cited

U.S. PATENT DOCUMENTS

| | | | | |
|---|---|---|---|---|
| 4,828,939 | A * | 5/1989 | Turley | H01M 4/8626 |
| | | | | 429/403 |
| 5,156,932 | A * | 10/1992 | Dougherty | H01M 2/1229 |
| | | | | 29/623.2 |
| 5,279,909 | A | 1/1994 | Horner et al. | |
| 5,298,683 | A | 3/1994 | Taylor | |
| 5,470,679 | A | 11/1995 | Lund et al. | |
| 5,916,709 | A * | 6/1999 | Arias | H01M 2/08 |
| | | | | 29/623.2 |
| 5,948,562 | A * | 9/1999 | Fulcher | H01M 2/021 |
| | | | | 429/162 |
| 6,210,826 | B1 | 4/2001 | Dopp et al. | |
| 10,090,515 | B2 | 10/2018 | Mui et al. | |
| 2008/0292953 | A1 | 11/2008 | Hosaka et al. | |
| 2009/0053601 | A1 | 2/2009 | Kelley | |
| 2010/0015517 | A1 | 1/2010 | Fujita et al. | |
| 2010/0223467 | A1 | 9/2010 | Dismore et al. | |
| 2010/0255371 | A1* | 10/2010 | Takayama | H01M 2/1673 |
| | | | | 429/210 |
| 2010/0310923 | A1 | 12/2010 | Ogg et al. | |
| 2011/0014520 | A1 | 1/2011 | Ueda | |
| 2011/0141618 | A1 | 6/2011 | Wallash et al. | |
| 2011/0223467 | A1* | 9/2011 | Shacklette | H01M 2/204 |
| | | | | 429/160 |
| 2013/0026409 | A1 | 1/2013 | Baker et al. | |
| 2013/0065105 | A1* | 3/2013 | Faust | H01M 4/14 |
| | | | | 429/153 |
| 2013/0130096 | A1 | 5/2013 | Lev | |
| 2014/0079985 | A1* | 3/2014 | Borden | H01M 2/14 |
| | | | | 429/185 |
| 2016/0308195 | A1 | 10/2016 | Mui et al. | |

FOREIGN PATENT DOCUMENTS

| | | |
|---|---|---|
| CN | 106133992 A | 11/2016 |
| EP | 3090462 B1 | 3/2020 |
| IN | 201617025763 A | 8/2016 |
| JP | 4828865 A | 9/1973 |
| JP | 62229772 A | 10/1987 |
| JP | 2005259379 A | 9/2005 |
| JP | 2013004864 A | 1/2013 |
| JP | 2017508241 A | 3/2017 |
| KR | 1020160121517 A | 10/2016 |
| KR | 101899419 B1 | 9/2018 |
| WO | WO-2008114738 A1 | 9/2008 |
| WO | WO-2012155082 A1 | 11/2012 |
| WO | WO-2015103295 A1 | 7/2015 |
| WO | WO-2015103304 A1 | 7/2015 |

OTHER PUBLICATIONS

"Chinese Application Serial No. 201480076523.2, Office Action dated May 25, 2018", W/English Translation, 8 pgs.

"Korean Application Serial No. 10-2016-7021022, Response filed Apr. 23, 2018 to Notice of Preliminary Rejection dated Oct. 23, 2017", w/ English Claims, 24 pgs.

"International Application Serial No. PCT/US2014/072804, International Preliminary Report on Patentability dated Jul. 13, 2016", 11 pgs.

"International Application Serial No. PCT/US2014/072804, International Search Report dated Apr. 23, 2015", 3 pgs.

"International Application Serial No. PCT/US2014/072804, Written Opinion dated Apr. 23, 2015", 9 pgs.

"International Application Serial No. PCT/US2014/072824, International Preliminary Report on Patentability dated Jul. 13, 2016", 9 pgs.

"International Application Serial No. PCT/US2014/072824, International Search Report dated Mar. 24, 2015", 2 pgs.

"International Application Serial No. PCT/US2014/072824, Written Opinion dated Mar. 24, 2015", 7 pgs.

"Canadian Application Serial No. 2,935,552, Response filed Jun. 18, 2018 to Office Action dated Dec. 18, 2017", w/ English Claims, 29 pgs.

"Chinese Application Serial No, 201480076523.2, Response filed Nov. 5, 2018 to Office Action dated May 25, 2018", w/ English Claims, 10 pgs.

"Japanese Application Serial No. 2016-543674, Response filed Jul. 25, 2018to Office Action dated Feb. 27, 2018", w/ English Claims, 11 pgs.

"U.S. Appl. No. 15/197,346, Non Final Office Action dated Jan. 16, 2018", 6 pgs.

"U.S. Appl. No. 15/197,346, filed Apr. 16, 2018 to Non Final Office Action dated Jan. 16, 2018", 7 pgs.

"U.S. Appl. No. 15/197,346, filed Oct. 27, 2017 to Restriction Requirement dated Aug. 28. 2017", 7 pgs.

"U.S. Appl. No. 15/197,346, Restriction Requirement dated Aug. 28, 2017", 8 pgs.

"Australian Application Serial No. 2014373800, First Examination Report dated Apr. 10, 2018", 3 pgs.

"Canadian Application Serial No. 2,935,552, Office Action dated Dec. 18, 2017", 4 pgs.

"Canadian Application Serial No. 2,935,552, Voluntary Amendment filed Dec. 9, 2016", 7 pgs.

"Chinese Application Serial No. 201480076523.2, Voluntary Amendment filed Mar. 23, 2017", with English translation of claims, 14 pgs.

"European Application Serial No. 14877474.8, Extended European Search Report dated Aug. 14, 2017", 10 pgs.

"European Application Serial No. 14877474.8, Response filed Feb. 9, 2017 to Communication Pursuant to Rules 161(2) and 162 EPC dated Aug. 26, 2016", 9 pgs.

"European Application Serial No. 14877474.8, Response filed Mar. 2, 2018 to Extended European Search Report dated Aug. 14, 2017", 47 pgs.

(56) References Cited

OTHER PUBLICATIONS

"Indian Application Serial No. 201617025763, Voluntary Amendment filed Aug. 19, 2016", 14 pgs.
"Japanese Application Serial No. 2016-543674, Office Action dated Feb. 27, 2018", w/ English Translation, 8 pgs.
"Korean Application Serial No. 10-2016-7021022, Notice of Preliminary Rejection dated Oct. 23, 2017", W/English Translation, 12 pgs.
Zuo, Wenhua, et al., "Battery-Supercapacitor Hybrid Devices: Recent Progress and Future Projects", Adv. Sci. 4, 1600539, [Online]. Retrieved from the Internet: <URL: https://www.ncbi.nlm.nih.gov/pmc/articles/PMC5514976/pdf/ADVS-4-na.pdf>, (2017), 1-21.
"Australian Application Serial No. 2014373800, Subsequent Examiners Report dated Feb. 20, 2019", 23 pgs.
"Indian Application Serial No. 201617025763, Examination Report dated Jul. 1, 2019", w/English Claims, 6 pgs.
"Japanese Application Serial No. 2016-543674, Examiners Decision of Final Refusal dated Dec. 11, 2018", 9 pgs.
"Japanese Application Serial No. 2016-543674, Response Filed Apr. 10, 2019 to Decision of Final Refusal dated Dec. 11, 2018", w/English Claims, 10 pgs.
"Indian Application Serial No. 201617025763, Response filed Dec. 11, 2019 to Examination Report dated Jul. 1, 2019", 27 pgs.
U.S. Appl. No. 15/197,346, filed Jun. 29, 2016, Bipolar Hybrid Energy Storage Device.

\* cited by examiner

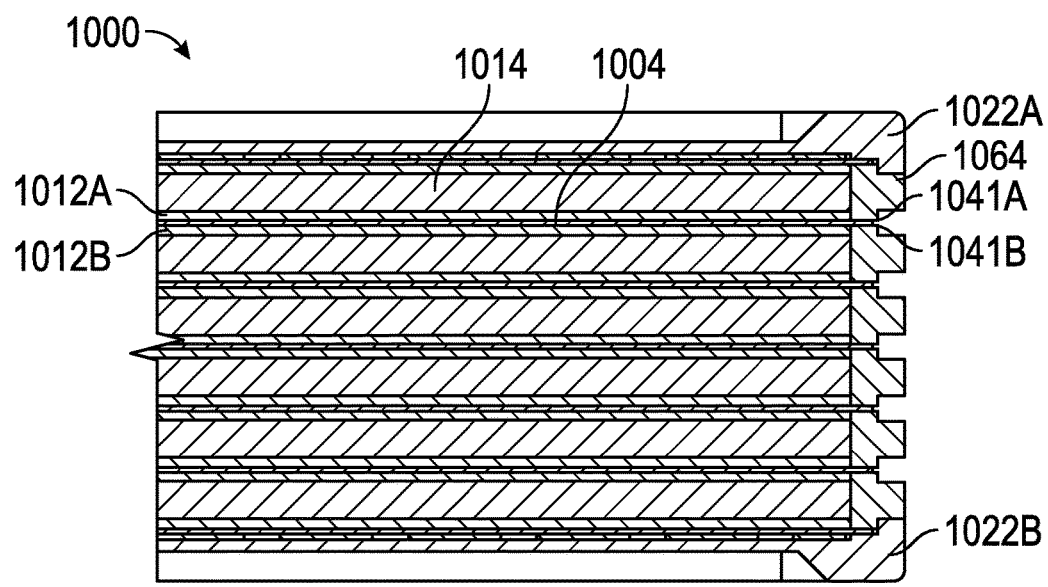
FIG. 10
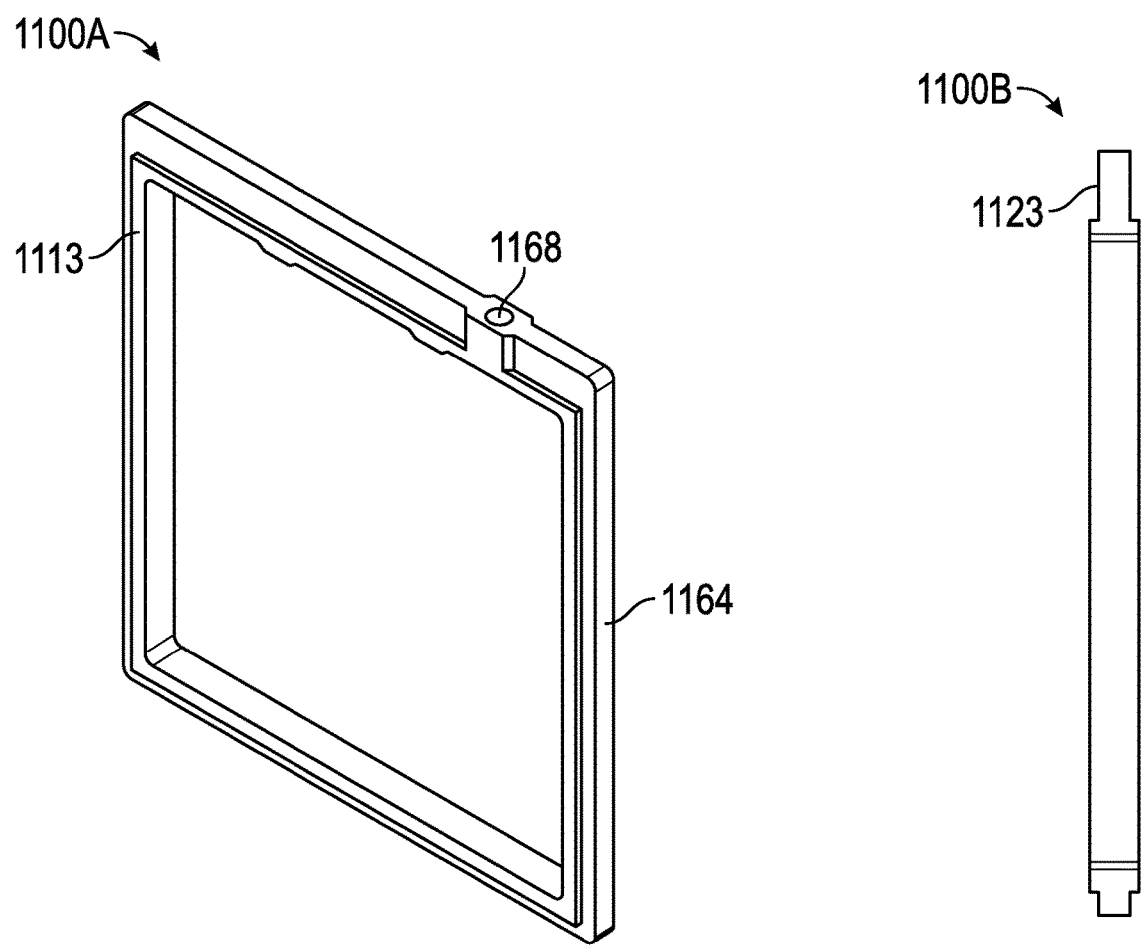
FIG. 11A
FIG. 11B

SEALED BIPOLAR BATTERY ASSEMBLY

CLAIM OF PRIORITY

This application is a U.S. National Stage Filing under 35 U.S.C. 371 and claims benefit of priority of International Patent Application PCT/US2014/072804, filed Dec. 30, 2014, and published on Jul. 9, 2015 as WO 2015/103295, which claims the benefit of priority of Moomaw et al., U.S. Provisional Application Ser. No. 61/921,919, titled "SEALED BIPOLAR BATTERY ASSEMBLY," filed on Dec. 30, 2013; (2) Mui et al., U.S. Provisional Application Ser. No. 61/921,871, titled "HYBRID BIPOLAR LEAD ACID BATTERY," filed on Dec. 30, 2013; (3) Moomaw et al., U.S. Provisional Application Ser. No. 62/044,601, titled "MECHANICALLY SEALED BIPOLAR BATTERY ASSEMBLY," filed on Sep. 2, 2014; and (4) Mui et al., U.S. Provisional Application Ser. No. 62/087,024, titled "BIPOLAR HYBRID ENERGY STORAGE DEVICE," filed on Dec. 3, 2014, the benefit of each of which is hereby presently claimed, and the entirety of each of which is hereby incorporated by reference herein.

BACKGROUND

Monopolar battery configurations generally have electrodes of one polarity, with each electrode being positive or negative. More specifically, in a monopolar battery, the battery is generally arranged such that there is a positive electrode followed by a negative electrode followed by another positive and so on. Each positive and negative electrode comprises a cell. Generally, in a monopolar battery these cells are each connected in parallel. This adds considerable complexity because of the wiring necessary to achieve all of the parallel connections.

OVERVIEW

Bipolar batteries have been the subject of significant research and development in recent decades, but commercially-viable configurations have remained elusive. There are myriad challenges associated with the bipolar configuration, but there are also advantages. For example, a bipolar configuration can provide high energy and power density due at least in part to the simplification of the battery internal structure, particularly with respect to interconnections between electrodes and between cells. A bipolar battery configuration can have a particularly short current path that travels generally perpendicularly to the active material, such as including a conduction path provided by a series connection through and between its cells. By contrast, generally-available monopolar battery configurations use a more circuitous parallel connection. The direct series path that can be used with a bipolar configuration can allow removal of unnecessary mass and also decrease resistance. This can be used to produce a bipolar battery that is lighter and better able to carry large currents without significant losses, in contrast with a monopolar configuration.

In one approach, a bipolar battery plate configuration can be provided (referred to as a "biplate" or "bipole"), such as including a portion that extends beyond the active material and creates a flange, such as to mate with another biplate or other portion of the battery assembly. Vertical uniformity can be maintained by an outer battery housing. This type of setup can be referred to as a "cup" in reference to the cross-sectional look of the casing. This flange can be welded or adhered, or press fit. These flanges can generally allow movement of the cell for compression as the cups can have some freedom of motion vertically. The flanges generally prevent electrolyte leakage. However, this example generally relies on the use of a metal biplate to achieve the appropriate shapes and flexibility. The present inventors have recognized, among other things, that metallic current collectors suffer from issues of corrosion over time that greatly decrease battery life.

In another approach, a bipolar battery construction can include use or creation of a non-permeable electrolyte wall made out of tantalum or other hydrophobic materials. This wall can be arranged to follow a perimeter of the active material along the current collector and can terminate with an upward curvature at the battery housing. This upward curvature can prevent electrolyte from breaching the edge of the casing and leaking into the next cell. In another similar approach, the upward curvature can be combined with a sponge-layer made from a hydrophobic material that provides further protection from electrolyte creep. These approaches can still be problematic. For example, such approaches assume that the battery is maintained in a particular orientation. Setting the battery on its side or even upside down would result in such seals losing their functionality. This removes one of the advantages of a "sealed" dam battery.

In yet another approach, a strong seal can be achieved by making the casing itself out of a gasket material. More specifically, the current collectors can be held between multiple acid-resistant gaskets that form the shape of a bipolar cell casing. These gaskets can be flexible, which allow for variable compressive forces on the battery, and also allow for venting through their cross section. By using some type of spring connection at the end caps, the flexible gaskets can be compressed to a desired level that will fluctuate as the battery ages to maintain specified compressive forces and prolong battery life. This approach generally includes an additional rigid external housing for protection. Such an external housing can be specified to be quite robust to provide impact protection, but at the cost of hurting overall energy density for the device.

Gaskets can be used to seal bipolar batteries, but in the example above, the casing itself is made from a rigid material and the gaskets are generally compressed between individual frames to create a seal. A gasket can include a non-corroding materials such as rubber or polytetrafluoroethylene (PTFE). With compression, it can be possible to achieve reliable seals. However, the level of compression can cause fracture of certain bipole materials and can difficult to maintain over the life of a battery. Careful surface preparation is generally provided or microvoids can develop between the bipole and the gasket.

By contrast with approaches exclusively including gaskets, adhesives can be used. For example, an adhesive in a liquid state can fill in voids in a bipole or casing frame, thus diminishing the chances of an ionic leak. Also, adhesives allow the casing to be nearly any shape, increasing flexibility. Adhesive dispensing equipment can provide for automated application of adhesive, thus resulting in high quality and consistent seals. Unfortunately, adhesives tend to be costly.

Many adhesives are readily attacked by acidic solutions and can be gradually degraded over prolonged exposure. Such degradation creates a potential for seal failure due to aging of the device. Adhesives are generally applied in liquid form and thus have a tendency to flow. More specifically, adhesive is usually pushed out of the joint itself during compression and into the surroundings. This can lead to visually unappealing seals that might not be cosmetically acceptable for users of a commercial product.

In yet another approach, metallic wires can be positioned between casing frames in a bipolar assembly and also between the bipoles and the casing. The assembly can then be compressed and placed inside an inductive chamber or coil. By energizing the coil, a magnetic field can be created that generates heat within the metallic wires placed within the assembly. This heat causes the surrounding casing material to melt, such as to assist in providing a hermetic seal. A "cup"-like shape can be provided for casing frames around each bipole. Generally, induction welding has been used in other unrelated applications and has proven to create very reliable joints. However, the specialized equipment to perform induction welding can be expensive and the metal used for induction welding wires is generally specified for compatibility with the battery chemistry to protect against contamination. Moreover, such a welding approach generally includes using a bipole material having a similar melting point to that of a frame or a seal will not be achieved.

The present inventors have recognized, among other things, that a combination of one or more aspects of the approaches mentioned above can be used to create a sealing process that also generally simplifies a battery assembly process. For example, the present inventors have, among other things, developed fabrication techniques and structural configurations that can be used to provide a sealed bipolar battery.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 10 illustrates generally a section view of an example that can include an assembled six-cell bipolar battery stack comprising current collectors and metallized fused seals.

FIGS. 11A and 11B illustrate generally views of an example that can include a metal seal casing frame.

DETAILED DESCRIPTION

Figure 1A:
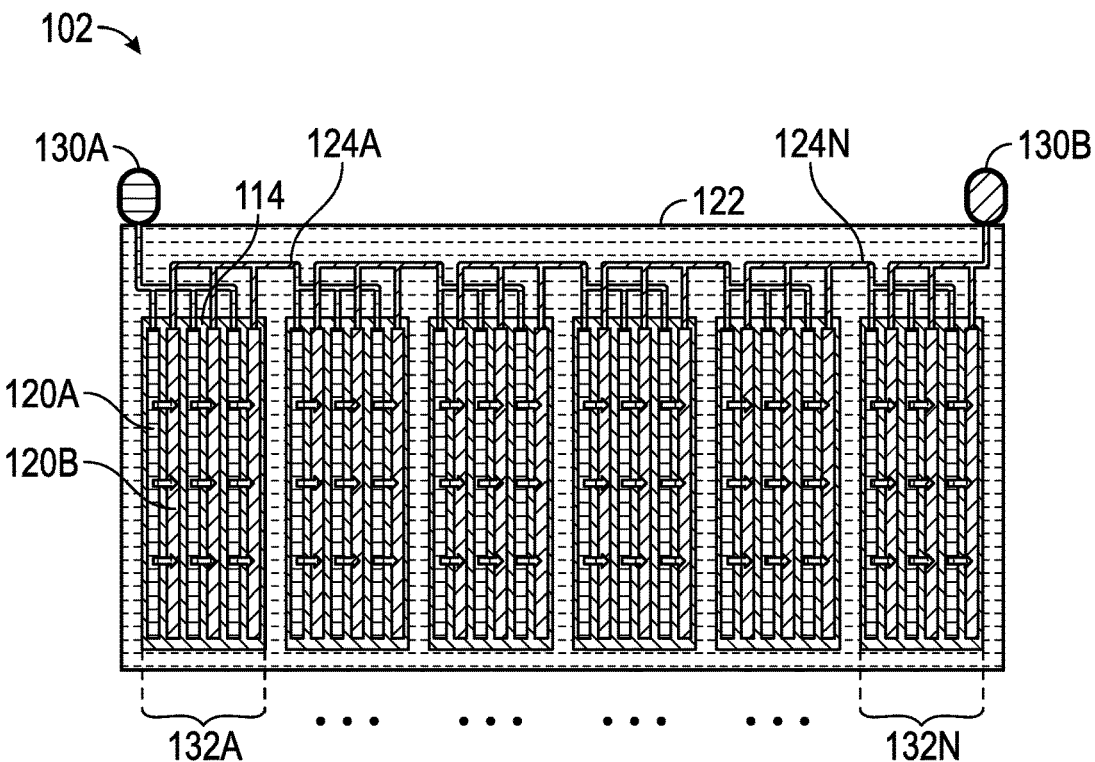
FIGS. 1A and 1B illustrate generally examples of a monopolar battery architecture and a bipolar battery architecture.
Figure 1B:
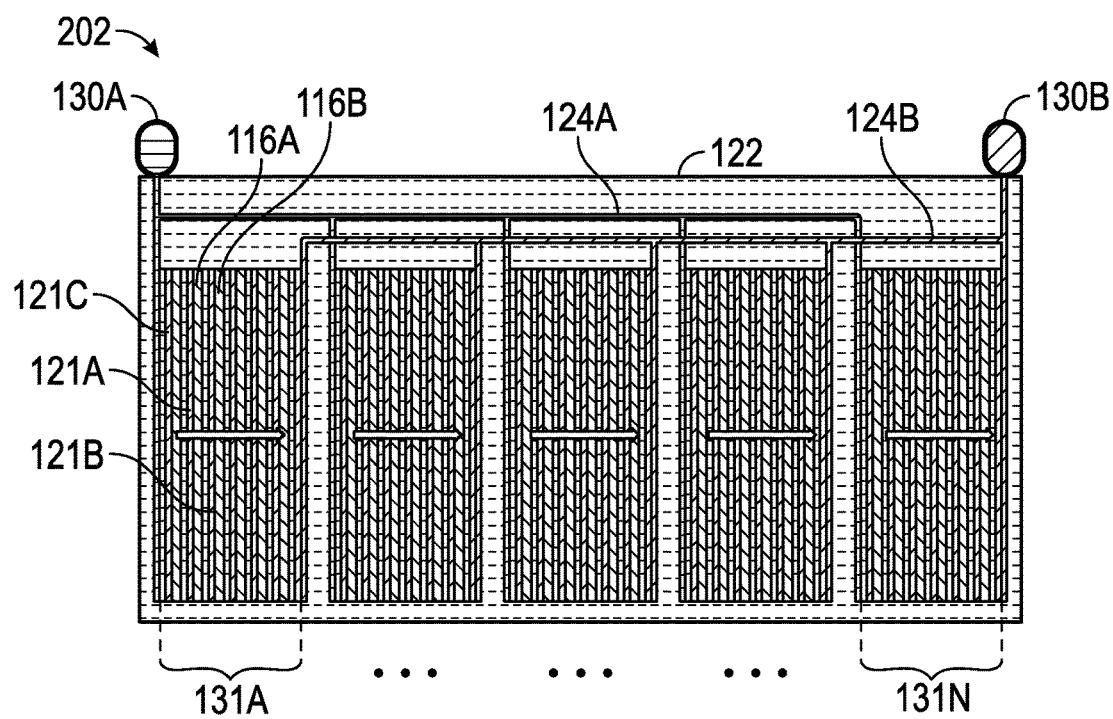

FIGS. 1A and 1B illustrate generally examples of a monopolar battery architecture 102 and a bipolar battery architecture 202. In a monopolar configuration, a current collector generally includes an active material of a single polarity (e.g., positive or negative) applied to both (e.g. opposite) sides of the current collector, such as including application of the active material in paste form. For example, a conductive silicon wafer can provide a substrate for the battery plate 120A assembly, such as to provide the current collector. The conductive silicon wafer 104 can include an ohmic contact layer, such as a metal silicide, to enhance conduction between an active material and the conductive silicon wafer. Such a silicide can include a metal species such as nickel, cobalt, titanium, tantalum, tungsten, molybdenum, or combinations thereof. In an example, an adhesion layer can also be included, such as to one or more of promote adhesion or to provide compatibility with an electrolyte in the electrolyte region 114. A housing 122 can be provided, and can (but need not) fluidically isolate the electrolyte region from other electrolyte regions between other plates.

A positive-negative pair can be formed such as including the first plate 120A having a first polarity active material and a second plate 120B having an opposite second polarity active material, to form an electrochemical cell in the electrolyte 114, such as shown illustratively in FIG. 1A. In a lead-acid example, such a single cell voltage can be around 2.1V. A number of cells can be arranged electrically in parallel configuration as a stack 132A. Individual stacks 132A through 132N can be connected in series to assemble a battery pack 102 such that the voltage can be represented as Ns*Vcell, where Ns can represent the number of stacks and Vcell can represent the cell voltage.

In FIG. 1A, a first terminal 130A can provide a first polarity, and a second terminal 130B can provide an opposite second polarity. The first and second terminals can be coupled to the first stack 132A and last stack 132N, respectively, and the stacks can be coupled together serially using a first bus 124A through an "Nth" bus 124N. By contrast to FIG. 1A, a battery architecture 202 using a bipolar plate configuration can offer design simplicity. Respective positive and negative active materials can be applied, such as through pasting, onto opposite sides of the current collector to form a bipolar plate.

FIG. 1B illustrates generally an example that can include a battery pack 202 having one or more bipolar battery plates, such as bipolar plates 121A, 121B, and 121C. Such bipolar plates can be sandwiched with electrolyte in regions 116A and 116B, for example, to form sealed cells. In an example, an electrolyte in region 116A can be one or more of fluidically isolated or hermetically sealed so that electrolyte cannot bypass the bipolar plate 121A to an adjacent region such as the electrolyte region 116B. As shown illustratively in FIG. 1B, cells can be disposed in a series configuration. The cells can be aligned to form a stack 131A.

In a bipolar architecture, a current collector (e.g., a silicon wafer such as included as a portion of the bipolar plate 121A) can be shared between the negative electrode of one cell and a positive electrode of the next. A first bus 124A can connect to a first electrode in each stack 131A through 131N, and a second bus 124B can connect to an opposite electrode in each stack 131A through 131N. By contrast with FIG. 1A, the stacks 131A through 131N can each provide serial connections through the bulk of the conductive silicon wafers as shown by the arrows. In this manner, a total number of interconnect buses external to the stack 131A through 131N can be reduced as compared to an architecture using monopolar plates.

Other configurations of interconnecting one or more stacks 131A through 131N can be used. For example, bipolar stacks 131A through 131N can be connected in parallel for lower voltage applications, such as to assemble a lower voltage battery pack. Alternatively, a single bipolar stack with many cells can form a higher-voltage pack. In either case, the voltage of the battery pack can be (Np−1)*Vcell, where Np can represent the number of current collector plates in each stack, and Vcell can represent the cell voltage.

Figure 2:
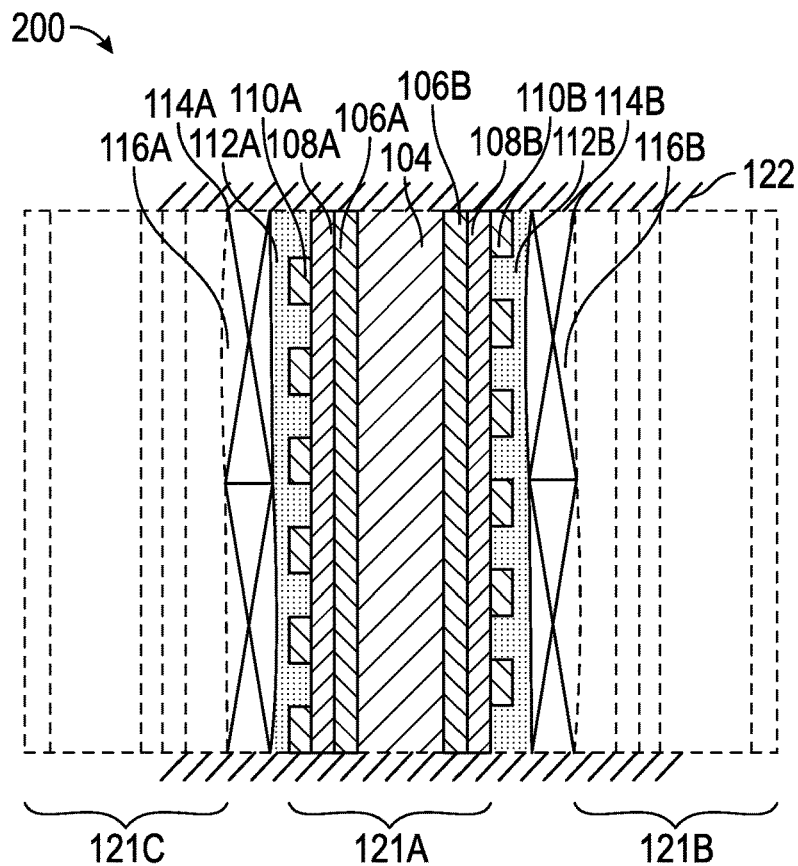
FIG. 2 illustrates generally a section view of an example including a bipolar battery plate or "biplate."

FIG. 2 illustrates generally a section view of an example including a bipolar battery plate 121A (a "biplate" or "bipole") and a corresponding bipolar battery architecture. A first bipolar battery plate 121A can include a conductive silicon wafer 104 as a current collector. The bipolar battery plate 121A can include one or more of an ohmic contact layer 106A and an adhesion layer 108A located at or near a first surface of the conductive silicon wafer 104. An active material 112A can include a first polarity, such as supported during or after fabrication by a mechanical support 110A. A second ohmic contact layer 106B can be included on a second surface of the conductive silicon wafer 104 opposite the first surface. The second ohmic contact layer 106B can include the same material as the first ohmic contact layer 106A or a different material, such as to provide an electrode for connection to other portions of a battery assembly, to provide a corrosion-resistant layer, or to provide a mirror image configuration having a stack-up similar to the first surface of the conductive silicon wafer 104. A second adhesion layer 108B can also be included. A second active material 112B can be included, such as having a polarity opposite the first active material 112A. A first electrolyte region 116A can separate the battery plate 121A from an adjacent battery plate 121C, and a second electrolyte region 116B can separate the battery plate 121A from another adjacent battery plate 121B. The electrolyte regions 116A and 116B can include a separator, such as assist in maintaining a specified separation between the battery plates. The electrolyte regions 116A and 116B are generally fluidically isolated from each other so that conduction occurs serially through a bulk of the conductive silicon wafer 104. Apparatus and techniques for providing a sealed housing 122 including fluidic isolation are described below.

In an example, a structure of a casing frame that can be used to support a bipole can be made out of or can include a strong, acid-resistant plastic such as acrylonitrile butadiene styrene (ABS), or one or more other materials such as polypropylene or polyvinyl chloride (PVC). Casing portions can be sized or shaped to stack on top of each other or within each other, thus forming a "cup." For example, the casings can include mating features (e.g., one or more cavity regions shaped to mate or align with corresponding features protruding from another casing), such as to produce an easily scalable architecture. The inventors have recognized, among other things, that a benefit of such a cup shape is that stress of supporting the battery assembly during impact can be shifted at least in part away from the current collector (e.g., a fragile or thin current collector) and transferred to the casing material (e.g., a plastic). In this manner, the current collectors can be made one or more of thinner or otherwise lighter in weight.

In an example, casing frames can be shaped symmetrically about their center lines. For example, the casing can be shaped to follow the current collector, such as along its perimeter on either side of a central cavity to house the electrolyte. However, in this configuration, the edges of the current collector might be exposed to an environment outside the battery. Extending flanges could be used to create walls of an electrolyte cavity, such as providing a void between the flange of one casing frame and the next, bounded on the bottom by the current collector edge. A plastic element can be installed to protect the current collector to inhibit exposure to the environment outside the battery.

One or more seals can be installed or otherwise provided as a portion of a biplate assembly, such as installed or included in a portion of a casing. In an example, a combination of deformable acid-resistant seals, acid-resistant adhesives, plastic casings, and a welding technique can be used produce a liquid-tight assembly, such as configured to reduce or suppress inter-cell leakage. The seals can be shaped to follow the outer perimeter of the current collector such as sized to be slightly larger than the current collector. The seals can have a width specified to provide a sufficient sealing area for specified deformation under various mechanical loads, for example. The seals can be made from a hydrophobic material such as polytetrafluoroethylene (PTFE). Such a hydrophobic material can provide additional leakage suppression or inhibition, at least in part because an aqueous electrolyte will have the tendency to ball-up when such electrolyte touches a surface of a hydrophobic seal. Such a seal can be highly deformable to accommodate surface imperfections of the current collector.

An adhesive used in construction of a battery assembly can include a structural adhesive such as an epoxy, such as provide resistance to a broad range of chemicals. However, many chemical-resistant adhesives can be used depending on the application and makeup of the battery electrolyte. In an example, the adhesive can be used between deformable plastic seals and the bipoles, such as to anchor the deformable seals and provide a wall that the electrolyte cannot penetrate should it manage to bypass the seals. Microns of adhesive can be sufficient for such an application, thus lowering cost by reducing an amount of adhesive dispensed during fabrication. The adhesive can serve more than one purposes in the examples described herein. For example, a deformable seal can be configured as an acid barrier. Corrosion or erosion of the adhesive can thus be reduced or minimized.

In another approach, use of adhesive can be removed entirely or reduced such as by using mechanical bonding methods. The basic casing shape need not change in such examples as compared to the approaches described above. For example, a thin deformable seal similar to the previous example can be used. For example, the battery casing can be formed to include a feature having a "knife-edged" frame, such as having the same (or about the same) perimeter as a current collector.

Knife-edged seals can be used to provide a hermetic seal, and such a seal configuration can maintain sealing properties even under high pressure. Generally, a knife-edge configuration includes a rigid knife-edge and a deformable material into which the knife-edge is pressed (or vice versa). An interaction between a sharp edge and a deformable component generates a stress concentration at the interface that can generally suppress or inhibit liquid breach. In various examples, a bipolar battery can include a current collector that is rigid, therefore it is generally not possible to press the casing into the current collector itself to generate a seal. However, a thin deformable seal can be used, such as including polytetrafluorethylene (PTFE) or one or more other elastic materials. Such a thin deformable seal can be placed over a current collector perimeter to interface with a knife edge. The deformable seal can be bonded to the current collector such as using a melt process or by way of an adhesive such as an epoxy. A variation of this example can include metallizing a sharp edge onto the perimeter of the current collector that would also interface with a deformable seal from the back side.

In another example, the present inventors have developed techniques and apparatus that can include use of metallization processes and soldered joints to assist in providing a sealed battery assembly. This can be used in addition to or instead of deformable seals and adhesives. In an example, a perimeter of a current collector can be metalized (e.g., on one or more surfaces orthogonal to the active-material-facing surface, such as an edge of the current collector) and the mating surface of the plastic casing that mates with the current collector can also be metalized. The current collector can be fit to a feature in the plastic casing, such as where the plastic casing includes a "cup" shape and the current collectors can form a bottom of the cup. Metallization of both components (e.g., current collector and casing) can be achieved through electroplating or electroless plating, for example.

Plastic components can generally be initially coated with nickel, but other metals could be deposited over the surface either instead of nickel or after nickel plating depending on contamination concerns or other criteria. The resulting metallized frame assemblies can be fused together using a soldering, sintering, or welding process, for example, around the edges of the current collector. This can provide a uniform seal, but such a seal might be weakened due to prolonged exposure to chemical attack. After the soldered joint is fabricated, an additional barrier can be placed around the joint to protect it from physical or chemical damage, such as including a plastic piece.

In another example, the present inventors have developed techniques and apparatus that can include using an injection molding or plastic melting operation, such as can eliminate additional components or seals. More specifically, the plastic casing or housing for the battery can be formed (e.g., molded) directly around the current collector. This can be performed using various techniques. For example, the current collector can be placed inside the injection molding die and the plastic casing would be injected directly around it. The casing can then cool and create a seal.

In another example, the current collector and the plastic casing can be fabricated independently and joined together, such as by ultrasonic welding. For example, the current collector can be compressed against a plastic casing frame and held securely in place. Movement allowed in parallel with the frame can result in a failure to establish a good seal. The compressed assembly can be placed on top of a microscopically flat metal surface (e.g., an anvil). The anvil can ensure that the seal does not deform out of plane while it melts. A tip, or sonotrode, can be brought down against the surface of the bipole where it interfaces with the frame. The sonotrode can be connected to a transducer and is excited, such as using about ~20 kiloHertz (kHz) low-amplitude ultrasonic waves. This focused ultrasonic energy heats up the two surfaces of the joint and fuses them together in milliseconds. An interfacial surface of the biplate can be formed into a pyramid. This can be referred to as an "energy director" and allows the biplate, which can have a higher melting temperature than the plastic frame, to focus energy from the sonotrode. The completed assembly of bipole and casing frame can then become a building block for a battery assembly comprising a stack of such blocks.

A weld process can be performed, such as after the casings, seals, and biplates have been assembled and those assemblies have been stacked to provide a specified battery voltage. Such a welding process fuses the casings together at their interface points to ensure that liquid cannot escape to the environment. This configuration can be used in addition to, or instead of, providing an outer casing for the battery. The melted plastic casings can provide sufficient structural protection for the assembly without requiring a separate outer casing. The plastic casing frames can be configured to include a specified shape, such as to accommodate a combination of sealing techniques. The welding techniques can be combined with other examples herein.

A weld process can include using a hot-plate welding technique to provide a battery assembly. For example, plastic casings can be held securely by clamps that grip an outer perimeter of the casings. The clamps can be used to press the casing frames (e.g., each side of the joint) against a heated platen until the surfaces become molten. The heated platen is then rapidly pulled away and the clamps can then force the two frames into each other. Compression is maintained until the plastic has cooled and the seal has fully formed. Generally, such a hot-plate process works quickly and reliably for similar materials. Furthermore, the visual qualities of the joint can be tailored for various applications, such as by adjusting a temperature of the heated platen as or by adjusting a configuration of the joining surfaces on the mating casing frames. Due to the firm hold that the clamps have on the frames, it is possible to perform a hot plate operation using casing frame assemblies including bipoles having active material present. As such, hot-plate welding can be arranged late in the battery manufacturing process, and can provide a battery assembly comprising a contained unit ready for filling with electrolyte, for example.

Figure 3:
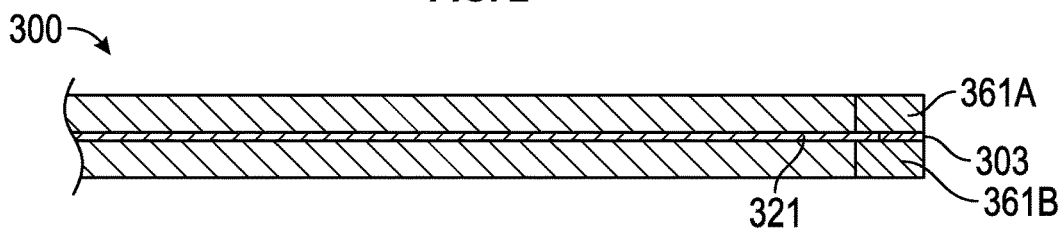
FIG. 3 illustrates generally a section view of an example that can include a biplate and compressible plastic seals.

FIG. 3 illustrates generally a section view of an example 300 that can include a biplate 321 and compressible plastic seals 361A and 361B. The edge of the seals 361A or 361B can extend beyond the edge of the biplate 321 allowing for an adhesive 303 to be located (e.g., deposited, dispensed or otherwise applied) to an edge of the biplate 321, such as to anchor the seals and prevent leakage should electrolyte breach the seals 361A or 361B. In an example, the adhesive 303 can extend the full width of the seals 361A or 361B, thus creating an adhesion layer between the biplate 321 and one or more of the seals 361A or 361B. Such an example can be used, for example, if the biplate 321 surface is particularly rough and the seals 361A or 361B are not capable of (or not specified to) fill the surface features of the biplate 321. In such an example, the adhesive 303 can provide a primary seal while the seals 361A or 361B can provide shock protection and variable compressibility for the biplate 321.

The present inventors have recognized, among other things, that sandwiching a current collector biplate between two highly compressible plastic seals 361A and 361B can provide a degree of shock protection for the current collector that is not provided when the current collector is adhered directly to a hard plastic casing. This allows even fragile materials (e.g., silicon wafers) to be used as biplates, thus allowing for thinner biplates and less weight in the battery.

Primarily, as the battery ages and compressive forces change on the plastic seals 361A and 361B, it is possible that a sufficiently large cavity could develop between the current collector biplate 321 and the seal 361A and 361B to allow a micro leak. Applying the adhesive 303 at the edge of the current collector biplate 321 helps to ensure that electrolyte is not allowed to wrap around the biplate 321 and short with an opposite-polarity biplate. Similarly, an adhesive seal can be placed between the plastic seal 361A or 361B and a plastic casing frame to ensure intimate contact is always maintained between those two components. Robustness of both the biplate-plastic seal and the plastic seal-plastic casing frame interfaces can provide enhanced reliability.

Figure 4:
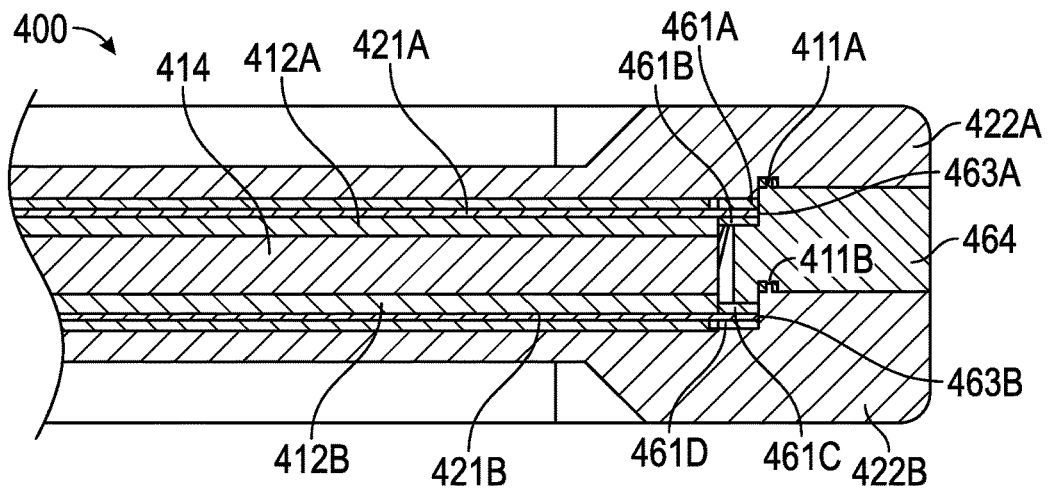
FIG. 4 illustrates generally a section view of an example that can include a single-cell bipolar battery comprising current collectors, plastic seals, and adhesive seals.

FIG. 4 illustrates generally a section view of an example 400 that can include a single-cell bipolar battery assembly comprising current collectors 421A and 421B, plastic seals 461A, 461B, 461C, and 461D, and adhesive seals 463A and 463B. In the illustrative example shown in FIG. 4, attached to a surface of each current collector 421A and 421B is an active material of the battery 412A and 412B, respectively. In an example, these active material layers 412A and 412B are separated with some type of inert separator 414. The separator 404 can provide further shock protection and generally prevents shorting of the active materials 412A and 412B as the battery is placed in different orientations. The current collectors 421A and 421B, plastic seals 461A, 461B, 461C, and 461D, and adhesive seals 463A and 463B can be placed within a plastic casing frame 464. In an example, the casing frame 464 includes ABS plastic. The top and bottom of the battery assembly can be bounded by two end caps 422A and 422B, which can be shaped to mate with the plastic casing frame 464. The end caps 422A and 422B, along with the casing frame 464, can be fused together to provide a sealed assembly.

For example, a hot-plate welding or other welding technique can be used. Such welding can include using welding joints 411A and 411B as shown illustratively in FIG. 4. For larger voltage batteries, additional cells can be stacked, such as upon the base casing frame 464, and then the stacked assembly can be capped with the end caps 422A or 422B, such as shown illustratively in FIG. 6. The total battery can then be compressed and the adhesive seals similar to seals 463A and 463B can be allowed to cure.

Figure 5:
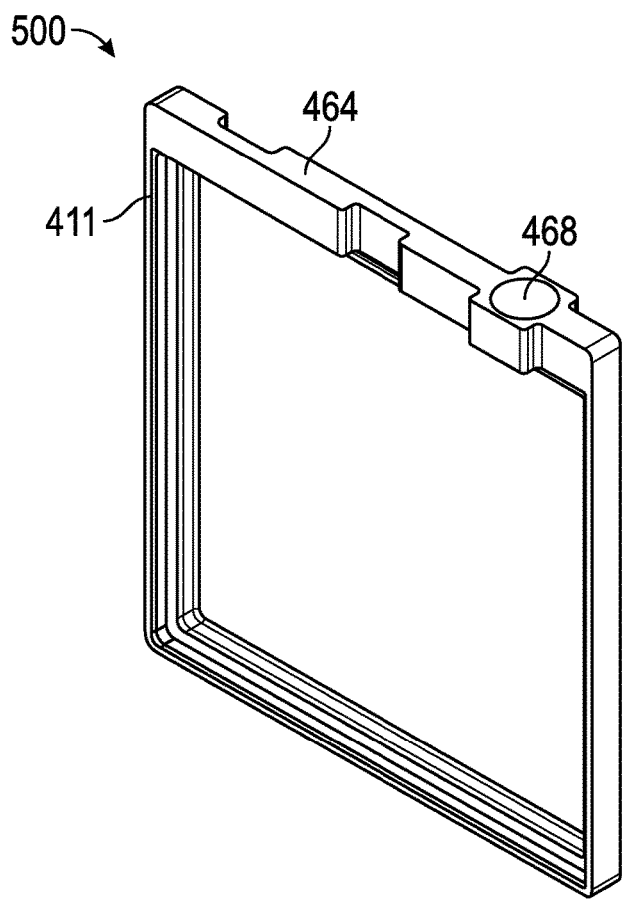
FIG. 5 illustrates generally a view of an example that can include a plastic casing frame.

FIG. 5 illustrates generally a view of an example 500 that can include a plastic casing frame 464. The casing frame 464 can be stackable, such as mate with other similarly-shaped casing frames, or one or more end caps. A stack of casing frames and corresponding biplates can be used to provide a sealed battery assembly. For example, the casing frame 464 can be equipped with a vent channel 468 that allows for the installation of a vent for batteries that include hydrogen or oxygen recombination. For completely sealed devices the vent channel 468 can be capped or omitted. In the example shown in FIG. 5, the casing frame 464 can include a joint 411, such as to facilitate a plastic welding process. In FIG. 5, the joint 411 includes a recessed joint.

Figure 6:
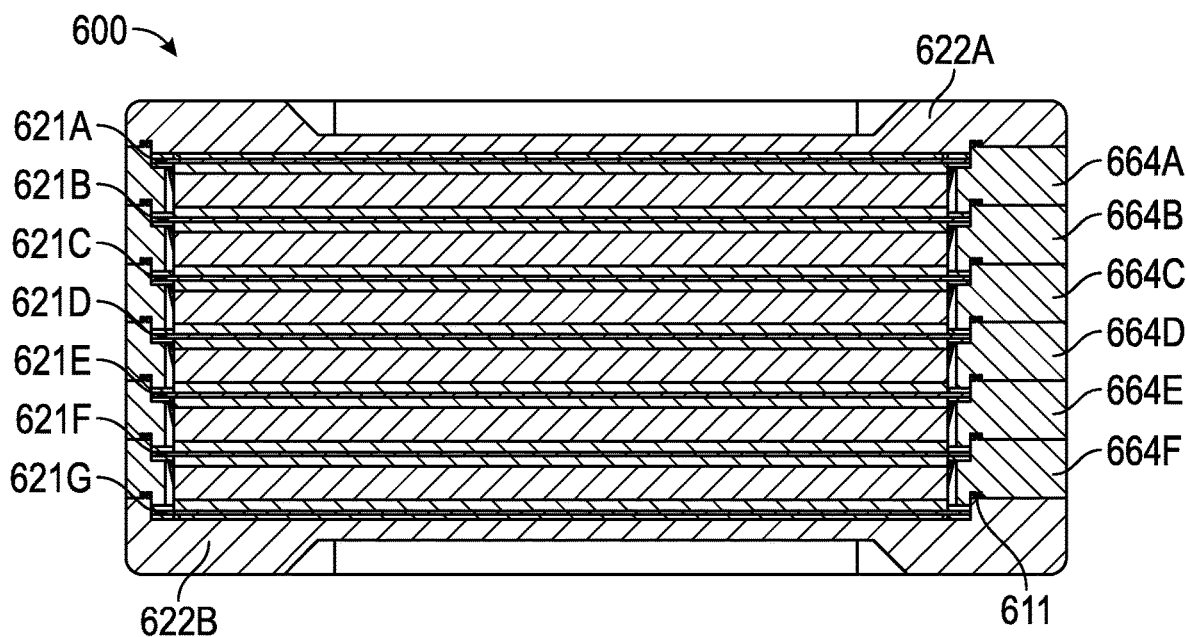
FIG. 6 illustrates generally a view of an example that can include a six-cell bipolar battery assembly.

FIG. 6 illustrates generally a view of an example 600 that can include a six-cell bipolar battery assembly. In the example shown in FIG. 6 illustratively, seven current collector assemblies 621A, 621B, 621C, 621D, 621E, 621F, 621G are included, such as configured similarly to the biplate shown illustratively and described in relation to the examples of FIG. 2 or 3. Other numbers of current collectors can be included, such as to provide a specified output terminal voltage.

In FIG. 6, six casing frames 664A, 664B, 664C, 664D, 664E, and 664F are shown. The stack of frames 664A through 664F are capped using end caps 622A and 622B, respectively. As in other example described herein, the current collectors can include active material on at least one side, such as on one side in the locations of collectors 621A and 621G, and on both sides elsewhere in the locations of collectors 621B through 621F. For example, the middle five collector assemblies 621B through 621F can include active material having a different polarity on opposite surfaces of the current collector, to provide a bipolar battery configuration when stacked. As shown in FIG. 3, seals can be provided in relation to each collector assembly 621A through 621G. In FIG. 6, each plastic casing frame 664A through 664F can be melted into the next casing frame at an edge or along a perimeter of the casing frames 664A through 664F. For example, each ring can include a weld joint 611, such as to inhibit or prevent electrolyte from leaking into an environment surrounding the assembly.

In another example of a fabrication technique, each casing frame 664A through 664F can be fabricated with a corresponding current collector assembly individually. A battery assembly can then be completed later as long, such as including compressive force applied to the current collector assembly to facilitate proper curing of seals.

Figure 7B:
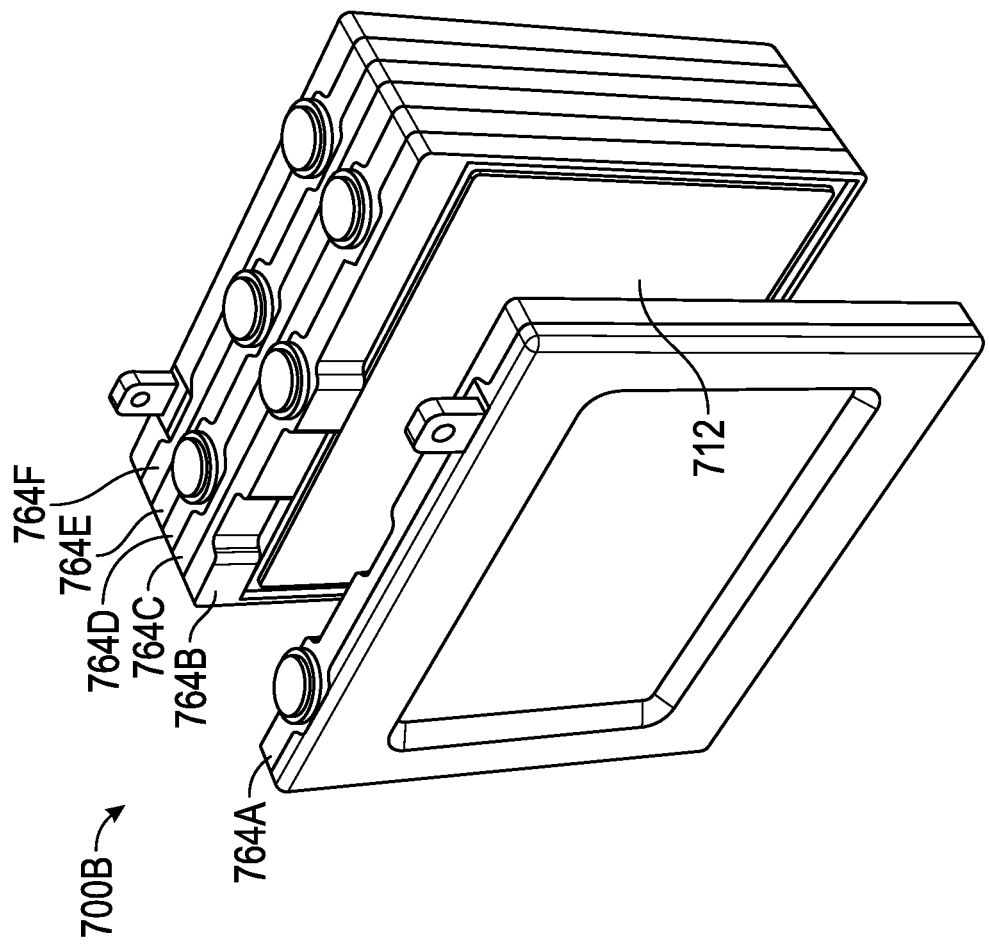
FIGS. 7A and 7B illustrate generally a view of an example that can include an assembled six-cell bipolar battery in FIG. 7A along with an exploded view in FIG. 7B showing how the casing frames can be stacked together.
Figure 7A:
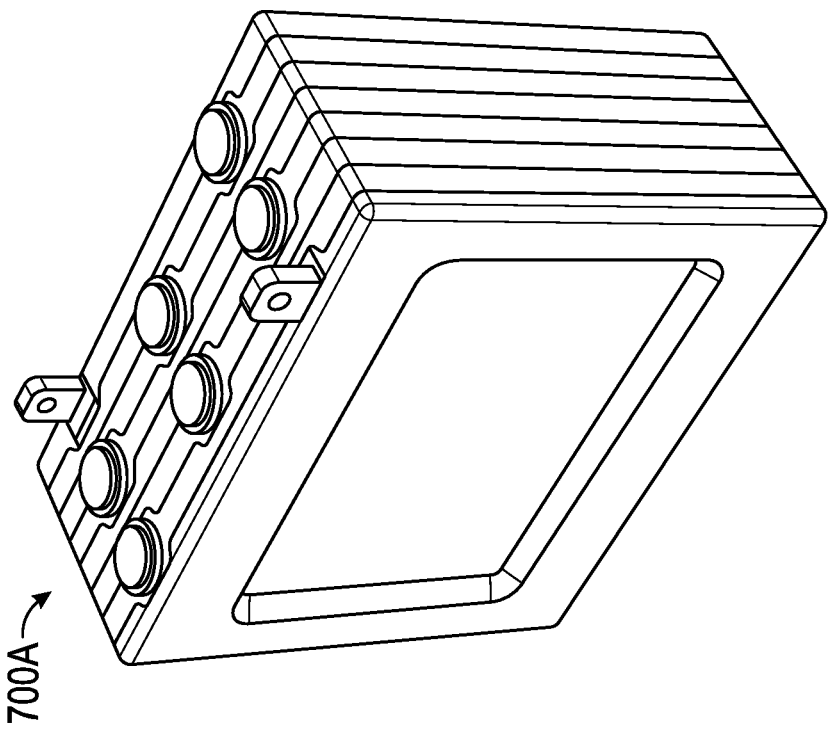

FIGS. 7A and 7B illustrate generally a view of an example that can include a six-cell bipolar battery assembly 700A in FIG. 7A along with an exploded view 700B in FIG. 7B showing how the casing frames can be stacked together. The assembly 700B can include rigid plastic casing frames 764A, 764B, 764C, 764D, 764E, and 764F. The casing frames can be assembled together, such as using a combination of discrete seals and welded seals, such as shown and described elsewhere herein. The combination of casing frames 764A through 764F, along with welded and discrete seals, can form a liquid-tight structure that protects the current collectors and active material 712 from shock and impact while maintaining consistent pressure on each cell.

An assembly process for providing the battery assembly 700A can include applying compressible plastic seals to each side of the current collectors forming the battery stack. As mentioned above, these seals can include PTFE, but other hydrophobic or chemically resistant seals can also be used. The seals are generally anchored to the current collector such as with the application of an adhesive seal around the perimeter. The plastic seals can extend beyond the edge of the current collector, such as shown in FIG. 3. This can create a channel in which to inject adhesive, such as an epoxy. Such adhesive seals can be sufficient to hold a stack of casing frames (e.g., frames 764A through 764F) and endcaps together. However, use of welded seals can also be employed around, such as to provide added protection against leaks.

Figure 8:
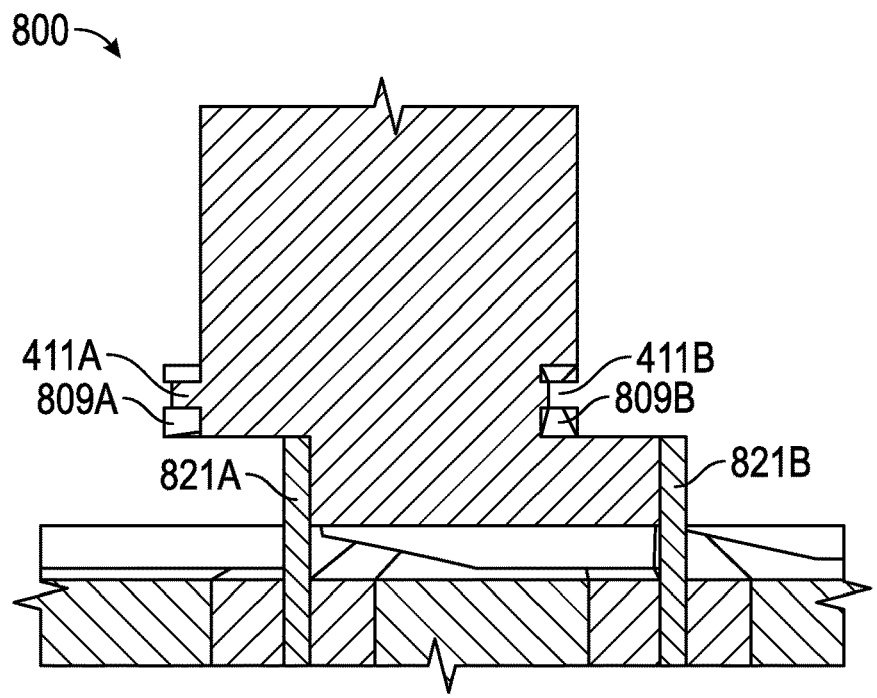
FIG. 8 illustrates generally an illustrative example of a detail view that can include recessed joints such as can be used for a welding process.

FIG. 8 illustrates generally an illustrative example 800 of a detail view that can include recessed joints 411A and 411B, such as can be used for a welding process to provide the battery assembly shown in FIG. 4 or 6, or in relation to other examples described herein. Various joints configurations are possible, but recessed joints 411A and 411B can be used to provide cosmetically attractive welded bonds while maintaining the strength and hermetic qualities specified for a battery assembly including current collector biplates 821A and 821B. One or more of the recessed joints 411A or 411B can be surrounded by a flash traps 809A or 809B that can help to provide a region to contain flowing material generated during melting or compression, such as during assembly.

Figure 13:
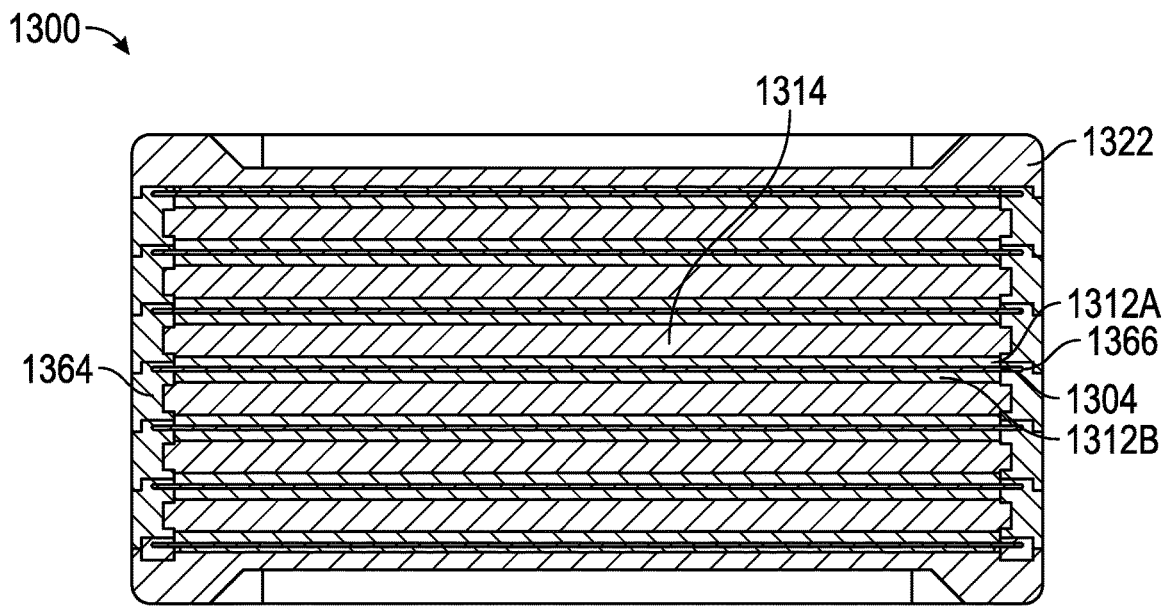
FIG. 13 illustrates generally a section view of an example that can include a six-cell using melted seals rather than metalized-fused seals.
Figure 15:
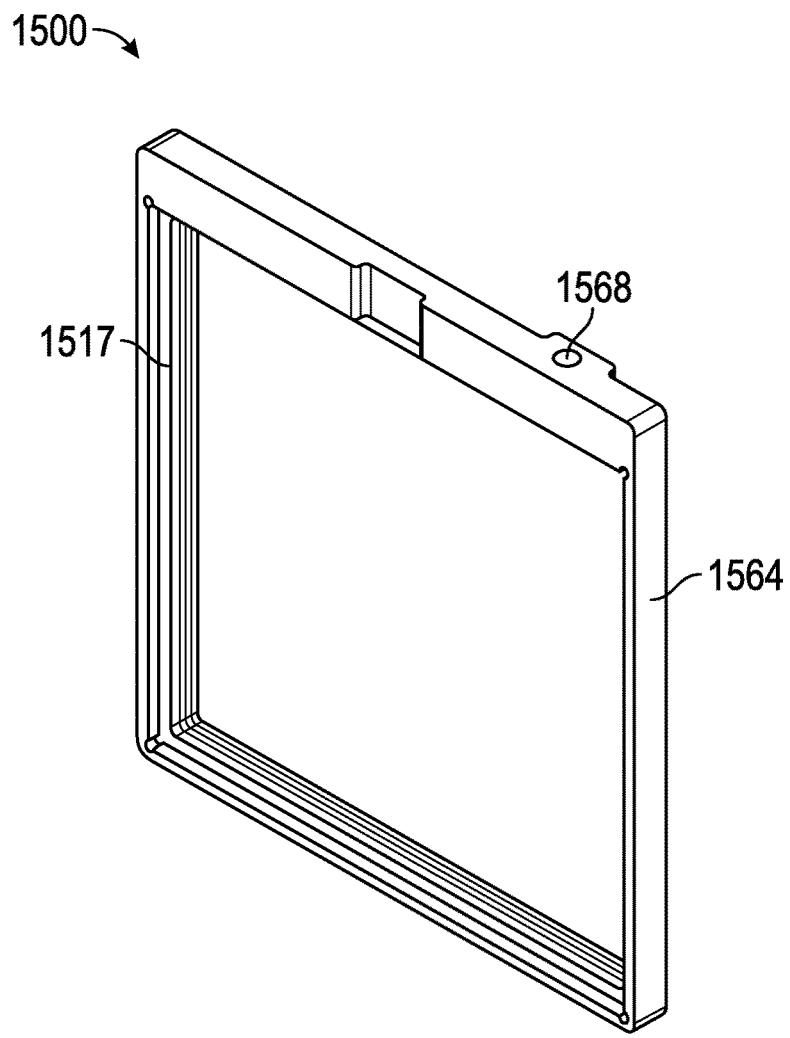
FIG. 15 illustrates generally a view of an example that can include a variation of the plastic casing frame, such as incorporating a non-symmetric "cup" configuration.
Figure 16:
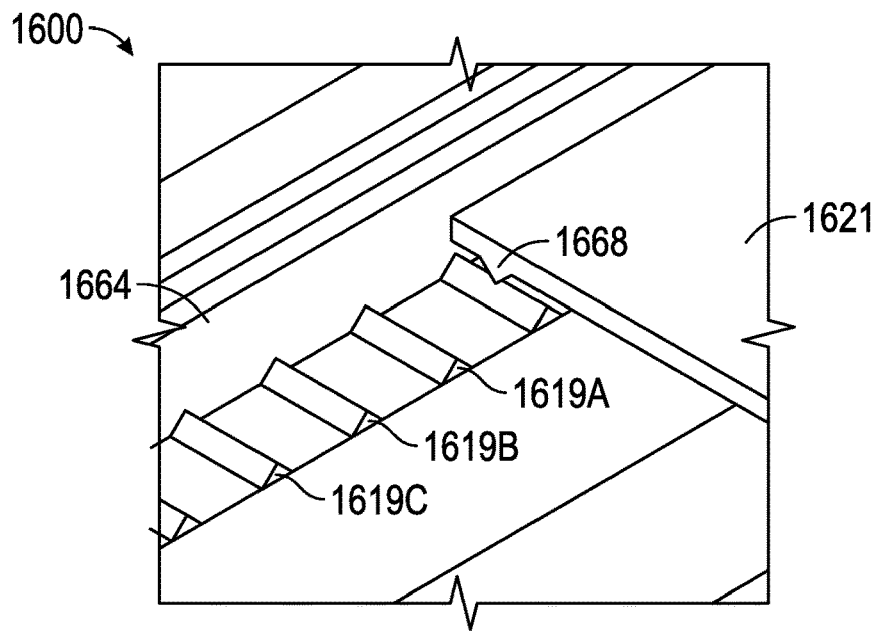
FIG. 16 illustrates generally a section view of an example that can include a current collector and casing frame assembly.
Figure 17:
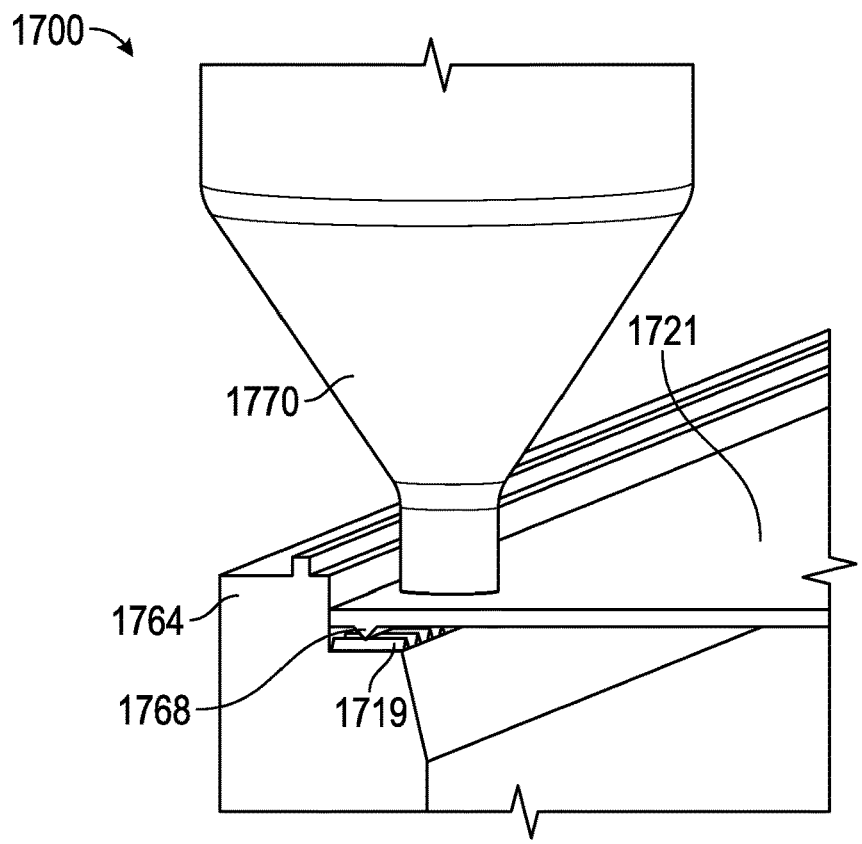
FIG. 17 illustrates generally a view of a welding configuration.

As mentioned above, various techniques and structural configurations can be used to provide a water-tight seal in a bipolar battery assembly without requiring use of adhesives or gaskets if there are cost or degradation concerns. Various examples described herein can include: metallized-surface seals such as shown in FIG. 10, melted shrink-seals such as shown in FIG. 13, knife-edged seals such as shown in FIG. 15 or 16, or ultrasonically welded seals such as shown in FIG. 17. A rigidity of these sealing techniques can help to ensure consistent pressure on the current collectors and active material throughout the entirety of battery life, such as can improve cycle life.

As mentioned above, respective battery cells can be assembled sequentially. An end cap can form a base and other cells can be stacked on the end cap until a specified series voltage is attained for the battery assembly. The assembly can then be compressed, such as until all of the casing frames are in tight contact with one another. The welded seals, such as using weld joints, can be applied around the perimeter as the battery is built up.

Figure 9:
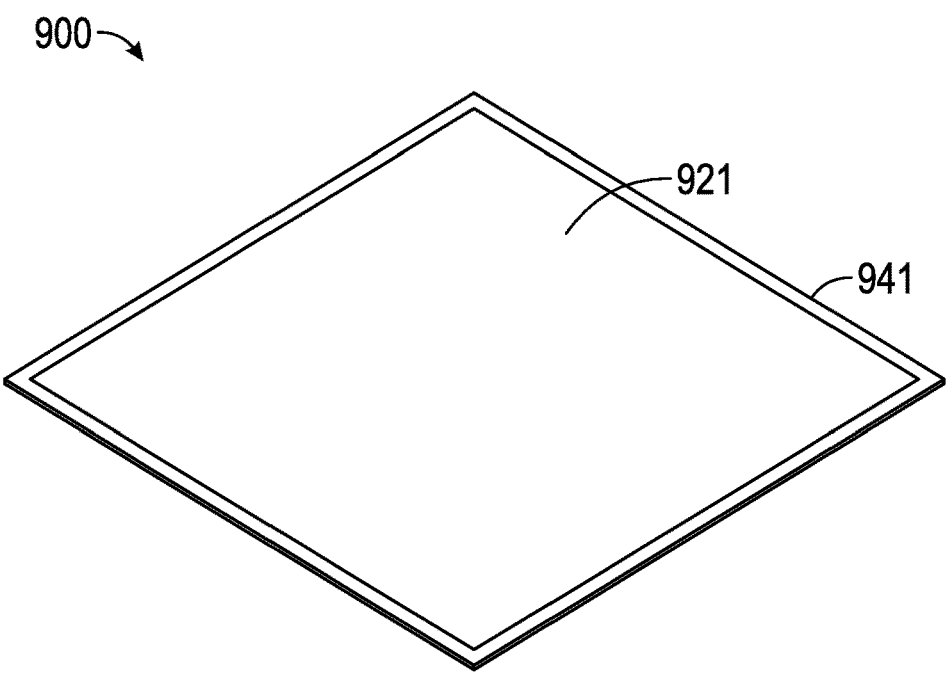
FIG. 9 illustrates generally a view of an example that can include a current collector and metallized frame around the perimeter.

FIG. 9 illustrates generally a view of an example 900 that can include a current collector 921, such as having a metallized frame 941 around the perimeter. The metallized frame 941 can extend outward, such as to the edge of the current collector 921, and inward toward an edge of an active material layer, for example.

FIG. 10 illustrates generally a section view of an example 1000 that can include an assembled six-cell bipolar battery stack comprising current collectors (e.g., a biplate 1004 having active material layers 1012A and 1012B, along with metallized fused seals 1041A and 1041. In FIG. 10, plastic casing frames such as a casing frame 1064 can be stacked, and plastic end caps 1022A and 1022B can be provided, such as to provide a sealed bipolar battery assembly.

Active material layers of adjacent biplates can be separated with an inert separator 1014. For example, the separator 1014 can provide shock protection and can prevent shorting of the active materials as the battery is placed in different orientations. Each current collector and metallized seal assembly can be fused to the bottom of a casing "cup", such as shown by the combination of casing frame 1064, along with the biplate 1004. The casing frame 1064 can be ring shaped and can include ABS plastic. The top and bottom of the battery can be bounded by the two end caps 1022A and 1022B, which are shaped to mate with the stack of plastic casing frames.

FIGS. 11A and 11B illustrate generally views 1100A and 1100B of an example that can include a metal seal casing frame. As mentioned above in relation to the example of FIG. 10, a metal seal casing frame 1164 can be plastic. For example, each casing frame 1164 can include with a vent channel 1168, that allows for the installation of a vent for batteries that include hydrogen or oxygen recombination. For completely sealed devices the vent channel 1168 can be capped or omitted. In the illustrative example of FIGS. 11A and 11B, the casing frame 1164 is symmetrical about the center line with a "cup" shape mirrored on both surfaces. This "cup" can be formed by extending a surface 1113 from the frame 1164. This extended surface 1113 can be at least partially metallized such as to facilitate adhesion with a current collector biplate. To provide current collector protection, a flange 1123 can extend to the outside around the perimeter.

Figure 12:
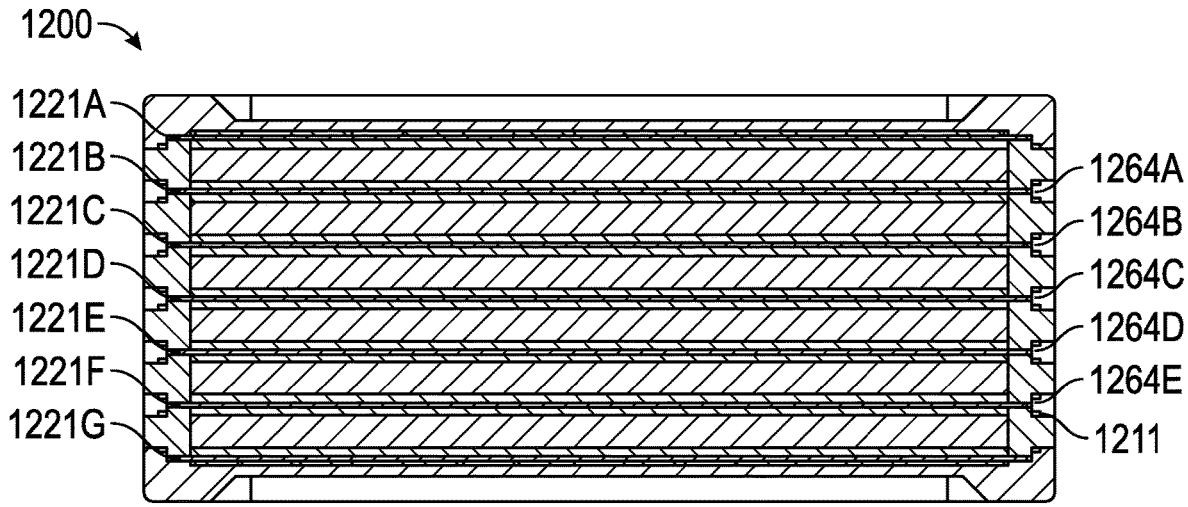
FIG. 12 illustrates generally a section view of an example that can include six-cell bipolar battery including seven current collector assemblies.

In the example shown illustratively in FIGS. 11A and 11B, an inner portion of the casing frame 1164 can include a hollow channel, such as just slightly smaller than the size of the current collector. This can allow for a greater volume of active material. The current collectors can be fused to the top and bottom of the casing frame 1164 such as along an outer perimeter. The central channel established within the assembled fused structure can be filled with active material and a separator such as shown in FIG. 3. This shape is particularly suited for the metallized seals, but many sealing methods can be used. In the example of the metallized seals, after fusing the metals parts together, encasement rings as shown in FIG. 12 can be installed around the outside of the seals, such as to suppress or inhibit environmental attack. These encasement rings can also provide a sink pulling heat from the battery by contacting the current collectors along their perimeters. This configuration can help to eliminate one of the challenges relating to cycling a bipolar battery: the buildup of heat within the cells.

FIG. 12 illustrates generally a section view of an example 1200 that can include six-cell bipolar battery including seven current collector assemblies 1221A, 1221B, 1221C, 1221D, 1221E, 1221F, and 1221G. Each of the current collector assemblies 1221A through 1221G can include active material on at least one surface of the current collector, as mentioned in relation to other examples herein. The middle five assemblies 1221B through 1221F can include active material having opposite polarities opposite surfaces of the current collector, for use in providing a bipolar battery assembly. In addition to the metallized seals within each current collector assembly as mentioned in relation to FIGS. 9 through 11, each plastic casing component can be melted into the next through joints such as a joint 1211, such as can be formed using a hot plate welding technique. For example, the exposed fused seals shown in FIG. 10 can be protected using encasing frames 1264A, 1264B, 1264C, 1264D, and 1264E, such as to protect soldered or otherwise bonded joints comprising the metalized fused seals.

As mentioned above in the examples of FIGS. 9 through 11, an example can include use of a metal coating on a plastic casing frame that can be soldered, welded, or fused to the current collector. Plastics such as ABS can be treated in chromic acid baths to electrically activate their surfaces and then such activated surfaces can be exposed (e.g., submerged) in electroless plating baths. Through one or more of agitation, addition of heat, or spontaneous reaction, metals are deposited on the surface. Nickel can be used as a base-layer due to its high activity. Concerns about nickel contamination can be avoided by electroplating a more inert (e.g., less reactive) metal over the nickel layer. For example, in a lead-acid battery, a strike of lead metal can be placed over the nickel to eliminate corrosion fears.

Generally, the metal used is selected for resistance to an electrolyte within the battery assembly, or the seal could fail prematurely. The process can be performed on the current collector in addition to the battery casing. Once both components are coated with the desired metal, they can be bonded through soldering, welding, melting, or other combinatory processes along a perimeter. Due to the chemical nature of these bonds, a robust seal can be provided.

FIG. 13 illustrates generally a section view of an example 1300 that can include a six-cell using melted seals such as a seal 1366, rather than metalized-fused seals. The configuration of the example of FIG. 13 can be similar to other examples, however FIG. 13 illustrates generally a less symmetrical casing frame 1364 configuration that can be used with a melt-type of seal. For example, positioning the current collector (e.g., a biplate 1304) near a top or bottom of the casing frame 1364 can facilitate incorporation of venting apparatus. An end cap 1322 for the device assumes a similar structural role and is therefore shaped similarly to other examples. The melted seal 1366 can follow the shape of the edge of the current collector 1304 exactly, such as to avoid compromising the seal.

Depending on the material of the current collector 1304 (e.g., including active materials 1312A and 1312B having opposite polarities on opposite faces of the current collector assembly), it is possible to forgo the metallized seals of other examples described herein and use a simple melting operation to fuse the battery components together. In an example, the casing frame 1364 can be molded directly to the current collector 1304. For example, the current collector 1304 can be accommodated by a die of an injection molding tool. The plastic casing frame 1364 can then be injected around the current collector 1304. Both can melt slightly and a completely fused assembly can be created that could not be breached by liquids.

Similarly, in another example, a pre-produced casing frame 1364 can be melted onto an existing current collector 1304 such as using spot welding, or another process. This can provide a seal configuration having low weight and favorable resistance to corrosion. However, if the melting temperature of the current collector is significantly higher than the casing ring, this technique can include using a lower-melting temp coating over the current collector.

Figure 14:
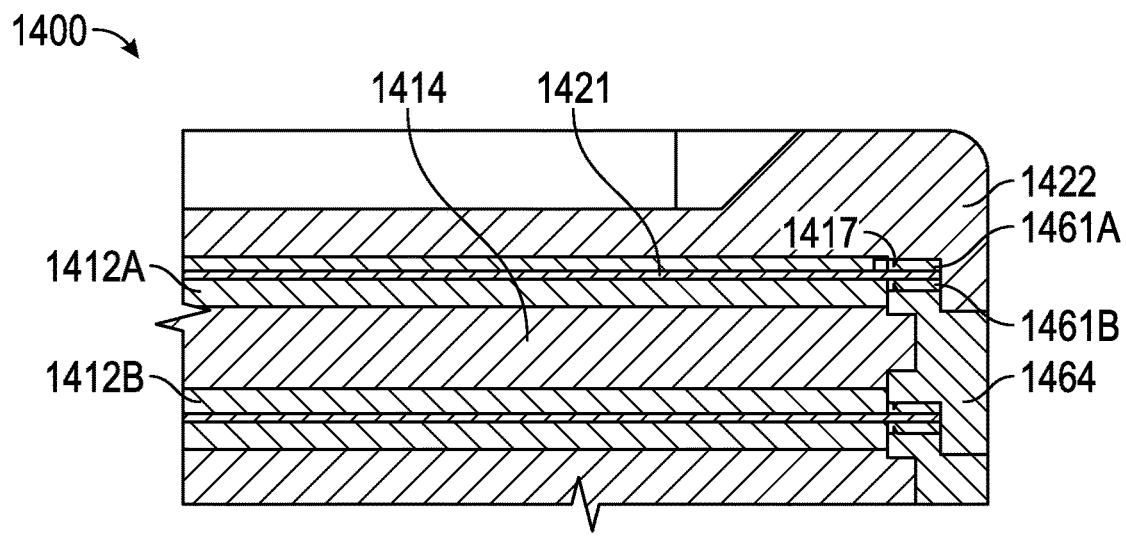
FIG. 14 illustrates generally a section view of an example that can include a battery stack including knife-edged joints.

If a metallized seal is not desired, or the mating pieces are too dissimilar for a melt operation, another example can include use of a knife-edge seal. This knife-edge configuration can be primarily mechanical, such as including pressing a sharp edge into a deformable mating surface. The stress concentration that develops at the interface is high in energy and therefore can drive liquids away. In a bipolar battery, this type of seal can be achieved on a small scale. FIG. 14 illustrates generally a section view of an example that can include a battery stack including knife-edged joints, such as can include a joint 1417. A plastic casing frame 1464 can be shaped to provide a knife edge on one or more surfaces, and the casing frame 1464 pressed into a deformable plastic seal, such as a seal 1461B. The seal 1461B (or other seals such as a seal 1461A) can be attached to a current collector 1421 by, for example, adhesive, press fit, metallizing, melting, or by way of forming a similar knife-edge as a surface feature of the current collector substrate. One or more of the seals 1461A or 1461B can include hydrophobic PTFE, or one or more other plastics and rubber materials can be used.

A bipolar battery configuration can be provided, such as using active materials 1412A and 1412B separated by an inert separator 1414, similar to other examples described herein. Placing the sealing edges close to the active material helps to ensure that electrolyte stays in constant contact with the battery active material and not the bare current collector.

Regardless of sealing method, various shapes can be used for the casing frames such as to help enhance current collector mechanical protection, such as while also reducing overall mass, in comparison to other approaches. Another casing ring configuration can include a non-symmetric "cup" shape as shown in FIG. 5 and FIG. 5. FIG. 15 illustrates generally a view of an example 1500 that can include a variation of the plastic casing frame 1564, such as incorporating a non-symmetric "cup" configuration. A knife-edge 1517 can be created on the inner surface of the "cup," such as can be placed in contact with the current collector directly. A bottom side of the casing can extend from the main frame and can be sized to match the current collector. A top side can include a cutout that mates with the extending surface on the bottom of a nearby frame (e.g., the next frame in the stack). In particular, the cutout can include the same perimeter as the current collector. This creates an easily stackable arrangement where current collectors can be placed on the shelf created by this cutout. A benefit of this shape is the robustness it affords the current collector. A "cup" shape can provide strength and can decrease the amount of mechanical load that the current collector carries, particularly as compared to a symmetrical cup configuration. Accordingly, this non-symmetric example can be used with thinner and lighter current collectors.

The end caps for the battery assembly can also feature a modified "cup" configuration, such as to mate with the casing frames 1564. Such end caps can house the battery terminals and end contacts, and such end caps need not provide primary structure for the battery stack so weight savings can be realized.

FIG. 16 illustrates generally a section view of an example 1600 that can include a current collector 1621, such as can include an energy director 1618 for use in an acoustic (e.g., ultrasonic) welding operation. According to various examples, the current collector and the casing frame need not be (and generally would not be) the same material. A high-throughput sealing technique can include using ultrasonic welding, such as to join dissimilar materials.

In the illustrative example of FIG. 16, the casing frame 1664 can also include one or more energy directors 1619A, 1619B, and 1619C, such as to assist in focusing energy from a sonotrode. For example, a hermetic joint can be formed such as using the energy director 1618 oriented substantially orthogonally (e.g., perpendicular) to the energy directors 1619A through 1619C. In this manner, a liquid-tight seal can be provided at an interface between the current collector 1621 and the casing frame 1664.

FIG. 17 illustrates generally a view of a welding configuration 1700. A sonotrode 1770 (also referred to as a "horn") can be energized with low-amplitude waves by a transducer. Such energy can cause the sonotrode 1770 to vibrate thousands of times per second. The transducer can also be coupled to the sonotrode 1770 to provide low-amplitude waves such that the sonotrode vibrates at about 20 kHz and such vibration is coupled through the tip and into the surfaces being joined. Adjusting the frequency from the transducer can change the rate at which the sonotrode 1770 vibrates. Higher frequencies generally cause faster movement that heats up the bonding surfaces more quickly. However, frequencies that are too high can cause part fracture and even burn-in. Accordingly, the sonotrode 1770 can be tuned to an appropriate specified frequency.

When the sonotrode 1770 compresses the current collector 1721 against the casing frame 1764, the energy directors

1718 and 1719 can be rapidly brought to their respective melting temperatures. The compression from the sonotrode 1770 can thereby join the frame 1764 and current collector such as to create a seal.

In an example, during a welding process, the sonotrode 1770 can be applied on a surface of the bipole current collector 1721. The sonotrode 1770 can apply a compressive force to press the bipole current collector 1721 into the casing frame 1764. The casing frame can be supported underneath by the anvil. The transducer can be switched on and the sonotrode 1770 begins its micro oscillations. These rapid movements funnel energy through an energy director 1718 on the bipole current collector 1770 down into the energy director 1719 on the casing frame 1764

Due to the small contact area at this interface temperature builds rapidly. The 1770 can be configured to move around an entire perimeter of the bipole current collector 1721, such as completing a rotation within a few seconds according to an illustrative example.

This movement can provide a localized region rapidly brought to the melting temperature and then such a region can rapidly cool as the sonotrode 1770 moves on. This allows fusion of dissimilar materials and generates excellent hermetic seals. The positioning of the energy directors should be arranged for uniformly around an entirety of the perimeter region being welded, but initial contact area before welding can be minimal. A pyramidal shape of the energy directors 1718 and 1719 facilitates limiting of an initial contact area, while also leaving channels for flashing to flow into during or after the welding operation.

When a high melting temperature material is fused with a low-melting temperature material, generally the higher melting temperature piece can be placed in a position contacting the sonotrode 1770 directly, such as because a portion of the assembly that touches the sonotrode 1770 generally reaches the highest temperature because it is getting the full effect of the oscillations.

If a large difference exists between the melting temperatures of the mating surfaces, energy directors can be placed exclusively on the top component while leaving the bottom mating surface flat (according to the orientation shown in FIG. 17). Flat surfaces generally have a high surface area and thus generally use more energy to melt. Use of two energy directors (e.g., an energy director on each surface of the joint being welded as shown illustratively in FIG. 17) can help to suppress or inhibit excess flash protruding into the active material cavity, but other variations are possible.

Figure 18:
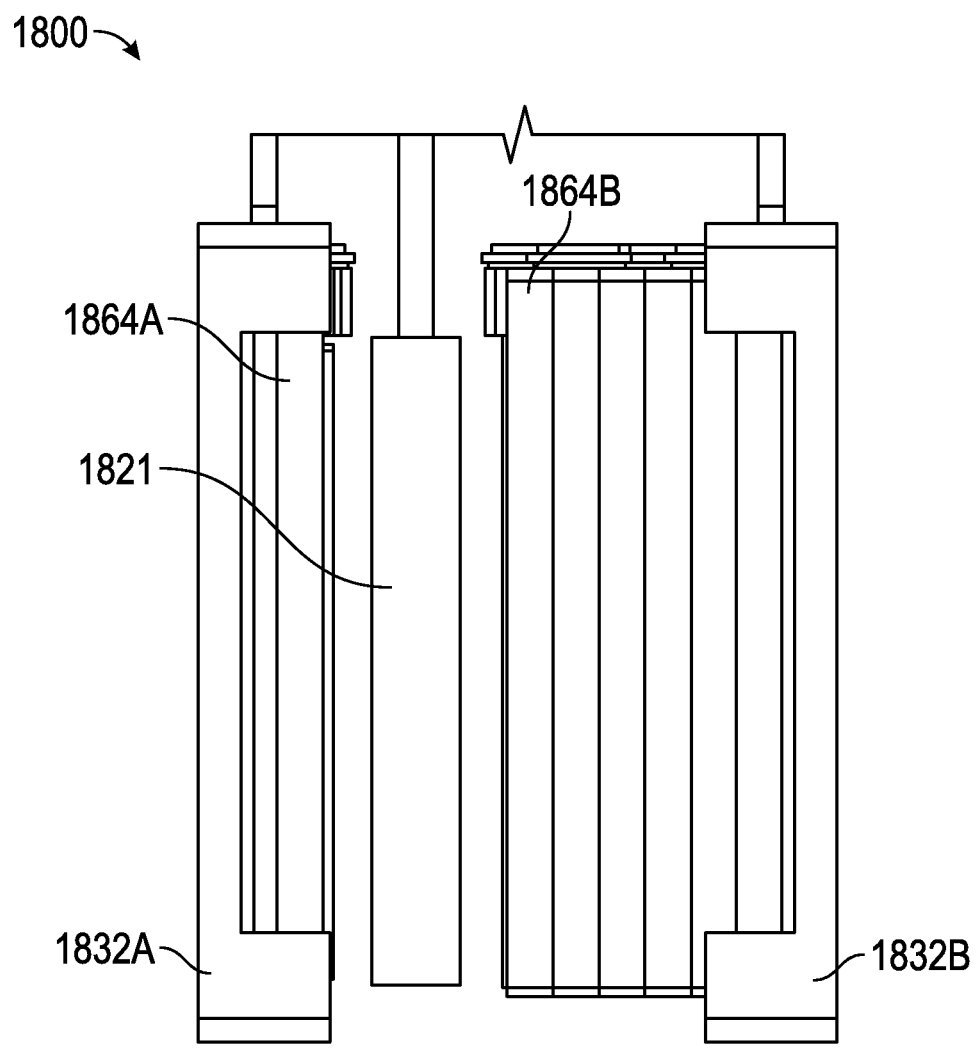
FIG. 18 illustrates generally a side view of a hot-plate welding configuration.

FIG. 18 illustrates generally a side view of an example 1800 that can include a hot-plate welding configuration. When each casing frame 1864A and 1864B is assembled it can be stacked on top of and fused to the next frame. In one approach, a hot plate welding technique can be used. Such a joint can hold a battery assembly together for its life and prevent leakage of electrolyte into the environment. In a hot-plate weld, the joint can include physically melting and fusing together casing frames 1864A and 1864B.

In the example of FIG. 18, casing frames 1864A and 1864B can be brought into contact with a heated platen 1821, such as to melt the surface of the casing frames 1864A and 1864B in a specified melt region along a perimeter. The casing frames 1864A and 1864B can be held firmly in place such as using clamps 1832A and 1832B. The clamps can include alignment features to help to ensure the parts contact the platen 1821 in a specified area of the platen 1821. The clamps 1832A and 1832B can then be used for pressing the joints together after heating to generate the weld, such as after the platen 1821 is removed.

Referring back to FIG. 8, FIG. 8 illustrates a first approach including recessed joints 411A and 411B, although various butt and flange joints can be used. A benefit of recessed joints is the presence of flash traps 809A and 809B that contains any excess material produced during the welding process. Such traps can improve a cosmetic appearance of a welded joint, and can provide room for material to flow, thus reducing or suppressing the likelihood of formation of air bubbles and generating a hermetic seal. Hot-plate welding is a fast process capable of welding large areas at once, such as using the configuration of FIG. 18.

For example, two pieces to be bonded together, in this example casing frames 1864A and 1864B, can be coupled to clamps 1832A and 1832B respectively, such that the clamps securely hold the frames 1864A and 1864B in place. These clamps 1832A and 1832B can then bring the frames 1864A and 1864B into contact with the heated platen 1821, whose surface can be specifically configured to match the joints on the frames 1864A and 1864B. It is generally not desired to heat up the entire surface of the frames 1864A and 1864B. Instead, only specified melt regions including or nearby the joints that are actually going to be welded together are arranged to contact the heated platen 1821. Such an approach can provide hermetic joints while maintaining the visual attractiveness of the battery casing assembly. The frames 1864A and 1864B can be held in contact with the platen 1821 until the joint surface begins to melt. The platen 1821 can then be rapidly pulled away (e.g., vertically) out of the way of the frames 1864A and 1864B. The clamps 1832A and 1832B can then be used force the molten joint surfaces together. Rapid cooling occurs which fuses the frames 1864A and 1864B together to provide a hermetic seal.

In a recessed joint (e.g., as in FIG. 8), the protruding sections of plastic on the opposing surfaces can be arranged to contact the heated platen 1821. According to an illustrative example, such surfaces can extend to about 125% of their final length pre-weld. The excess material can then be forced into the flash traps within the joints, increasing a strength of the weld. Non-recessed joints such as flange-joints still generally include excess material for the weld to properly form, but the excess flash can be forced to the exterior of the part and results in less visually appealing bonds. The temperature of the heated platen 1821 can be adjusted to control the distribution of flash, but a temperature to melt the joint surfaces can be generally specified as a minimum temperature. Hot-plate welding is generally satisfactory for bonding similar materials.

Various Notes & Examples

Example 1 can include or use subject matter (such as an apparatus, a method, a means for performing acts, or a device readable medium including instructions that, when performed by the device, can cause the device to perform acts), such as can include or use a bipolar battery assembly, comprising a first stackable casing frame, a first rigid current collector including at least one surface having a first active material conductivity type located thereon, a second rigid current collector including at least one surface having a second active material conductivity type located thereon, the second active material conductivity type corresponding to a battery electrode polarity opposite the first active material conductivity type, a first electrolyte region defined at least in part by the stackable casing frame, and the first and second rigid current collectors, at least one of a compressible plastic seal, an adhesive seal, a metallized seal, a melt seal, a knife-edged seal, or a welded seal, configured to provide a liquid-tight enclosure for the first electrolyte region.

Example 2 can include, or can optionally be combined with the subject matter of Example 1, to optionally include at least one of the first or second rigid current collectors comprising a bipolar battery plate having a first active material type on a first surface, and having the second active material type on a surface opposite the first surface.

Example 3 can include, or can optionally be combined with the subject matter of one or any combination of Examples 1 or 2 to optionally include rigid current collectors comprising silicon wafer substrates.

Example 4 can include, or can optionally be combined with the subject matter of one or any combination of Examples 1 through 3 to optionally include a second stackable casing frame and a third rigid current collector, wherein the bipolar battery assembly of claim 1 comprises a series arrangement of cells defined by the first, second, and third rigid current collectors, the series arrangement established at least in part by physically stacking the stackable casing frames; and wherein the second and third rigid current collectors, along with the second stackable casing frame define a second electrolyte region, the second electrolyte region fluidically isolated from the first electrolyte region at least in part by at least one of the compressible plastic seal, the adhesive seal, the metallized seal, the melt seal, the knife-edged seal, or the welded seal configured to provide a liquid-tight enclosure for the first electrolyte region.

Example 5 can include, or can optionally be combined with the subject matter of one or any combination of Examples 1 through 4 to optionally include stackable casing frames fused together along an outer perimeter of the stackable casing frames.

Example 6 can include, or can optionally be combined with the subject matter of one or any combination of Examples 1 through 5 to optionally include compressible plastic seals shaped to follow a perimeter of the current collector and anchored to the current collector using an adhesive applied along the edge of the current collector to provide a barrier to an electrolyte located in the first electrolyte region.

Example 7 can include, or can optionally be combined with the subject matter of one or any combination of Examples 1 through 6 to optionally include compressible plastic seals and adhesive seals configured to provide the liquid-tight enclosure for the first electrolyte region, the compressible plastic seals and associated adhesive seals including materials specified for compatibility with a battery chemistry of the sealed bipolar battery assembly.

Example 8 can include, or can optionally be combined with the subject matter of one or any combination of Examples 1 through 7 to optionally include metallized seals configured to provide the liquid-tight enclosure for the first electrolyte region, the metalized seals include materials substantially not corroded by a battery chemistry of the sealed bipolar battery assembly.

Example 9 can include, or can optionally be combined with the subject matter of one or any combination of Examples 1 through 8 to optionally include metallized seals configured to provide the liquid-tight enclosure for the first electrolyte region, the metallized seals bounded by the perimeter of the current collectors and the active materials.

Example 10 can include, or can optionally be combined with the subject matter of one or any combination of Examples 1 through 9 to optionally include melted seals configured to provide the liquid-tight enclosure for the first electrolyte region, the melted seals including melt regions comprising a portion of the current collectors and a portion of the stackable casing frame, the melt regions isolating adjacent cells in the sealed battery assembly from each other and from the environment around the sealed battery assembly.

Example 11 can include, or can optionally be combined with the subject matter of one or any combination of Examples 1 through 10 to optionally include knife-edge seals configured to provide the liquid-tight enclosure for the first electrolyte region, the knife-edge seals comprising a portion of the current collector and a compressible plastic seal.

Example 12 can include, or can optionally be combined with the subject matter of one or any combination of Examples 1 through 11 to optionally include first and second current collectors fused with the stackable casing frame using an ultrasonic weld.

Example 13 can include, or can optionally be combined with the subject matter of one or any combination of Examples 1 through 12 to optionally include a casing frame symmetric in cross section about at least one axis.

Example 14 can include, or can optionally be combined with the subject matter of one or any combination of Examples 1 through 12 to optionally include a casing frame configured to be asymmetric in cross section about at least one axis to define an asymmetric cup configuration.

Example 15 can include, or can optionally be combined with the subject matter of one or any combination of Examples 1 through 14 to optionally include a casing frame configured to follow an outer perimeter of one of the current collectors and including a flange extending from at least one surface.

Example 16 can include, or can optionally be combined with the subject matter of one or any combination of Examples 1 through 15 to include, subject matter (such as an apparatus, a method, a means for performing acts, or a machine readable medium including instructions that, when performed by the machine, that can cause the machine to perform acts), such as can include a bipolar battery assembly, comprising a first stackable casing frame, a first silicon wafer current collector including at least one surface having a first active material conductivity type located thereon, a second silicon wafer current collector including at least one surface having a second active material conductivity type located thereon, the second active material conductivity type corresponding to a battery electrode polarity opposite the first active material conductivity type, a first electrolyte region defined at least in part by the stackable casing frame, and the first and second rigid current collectors, at least one of a compressible plastic seal, an adhesive seal, a metallized seal, a melt seal, a knife-edged seal or a welded seal configured to provide a liquid-tight enclosure for the first electrolyte region. In Example 16, at least one of the first or second rigid current collectors comprises a bipolar battery plate having a first active material type on a first surface, and having the second active material type on a surface opposite the first surface.

Example 17 can include, or can optionally be combined with the subject matter of one or any combination of Examples 1 through 16 to include, subject matter (such as an apparatus, a method, a means for performing acts, or a machine readable medium including instructions that, when performed by the machine, that can cause the machine to perform acts), such as can include forming a bipolar battery plate and casing assembly comprising a first stackable casing frame coupled to a first rigid current collector including at least one surface having a first active material conductivity type located thereon, including forming at least one of a compressible plastic seal, an adhesive seal, a metallized seal, a melt seal, a knife-edged seal, or a welded seal, configured to provide a liquid-tight enclosure for a first electrolyte region when the first stackable casing frame and the first rigid current collector are stacked with a second stackable casing frame and a second rigid current collector; the electrolyte region defined at least in part by the first rigid current collector, the second rigid current collector, and the first stackable casing frame.

Example 18 can include, or can optionally be combined with the subject matter of Example 17, to optionally include forming a battery assembly including a second stackable casing frame and a third rigid current collector, the forming including physically stacking the first and second stackable casing frames to provide a series arrangement of cells defined by the first, second, and a third rigid current collector. In Example 17, the second and third rigid current collectors, along with the second stackable casing frame define a second electrolyte region, the second electrolyte region fluidically isolated from the first electrolyte region at least in part by at least one of the compressible plastic seal, the adhesive seal, the metallized seal, the melt seal, the knife-edged seal, or the welded seal configured to provide a liquid-tight enclosure for the first electrolyte region.

Example 19 can include, or can optionally be combined with the subject matter of Example 18, to optionally include fusing the first and second stackable casing frames together along an outer perimeter.

Example 20 can include, or can optionally be combined with the subject matter of one or any combination of Examples 17 through 19 to optionally include forming compressible plastic seals shaped to follow a perimeter of the current collector and anchored to the current collector using an adhesive applied along the edge of the current collector to provide a barrier to an electrolyte located in the first electrolyte region.

Example 21 can include, or can optionally be combined with the subject matter of one or any combination of Examples 17 through 20 to optionally include forming compressible plastic seals and adhesive seals configured to provide the liquid-tight enclosure for the first electrolyte region, the compressible plastic seals and associated adhesive seals including a material specified for compatibility with a battery chemistry of the sealed bipolar battery assembly.

Example 22 can include, or can optionally be combined with the subject matter of one or any combination of Examples 17 through 21 to optionally include forming metallized seals configured to provide the liquid-tight enclosure for the first electrolyte region, the metalized seals including a material substantially not corroded by a battery chemistry of the sealed bipolar battery assembly.

Example 23 can include, or can optionally be combined with the subject matter of one or any combination of Examples 17 through 22 to optionally include forming metallized seals configured to provide the liquid-tight enclosure for the first electrolyte region, the metallized seals including a metalized seal bounded by the perimeter of the current collector and the active material.

Example 24 can include, or can optionally be combined with the subject matter of one or any combination of Examples 17 through 23 to optionally include forming a melted seal configured to provide the liquid-tight enclosure for the first electrolyte region, the melted seal including a melt region comprising a portion of the current collector and a portion of the stackable casing frame, the melt region isolating adjacent cells in the sealed battery assembly from each other and from the environment around the sealed battery assembly when the first stackable casing frame is stacked with another casing frame.

Example 25 can include, or can optionally be combined with the subject matter of one or any combination of Examples 17 through 24 to optionally include forming knife-edge seals configured to provide the liquid-tight enclosure for the first electrolyte region, the knife-edge seals comprising a portion of the current collector and a compressible plastic seal.

Example 26 can include, or can optionally be combined with the subject matter of one or any combination of Examples 17 through 25 to optionally include fusing the first current collector with the stackable casing frame using an ultrasonic weld.

Example 27 can include, or can optionally be combined with the subject matter of one or any combination of Examples 17 through 26 to optionally include forming a welded seal to provide the liquid-tight enclosure for the first electrolyte region.

Example 28 can include, or can optionally be combined with the subject matter of one or any combination of Examples 17 through 27 to optionally include forming a welded seal using hot-plate welding.

Example 29 can include, or can optionally be combined with the subject matter of one or any combination of Examples 17 through 28 to optionally include forming the stackable casing frame including molding the stackable casing frame.

Example 30 can include, or can optionally be combined with the subject matter of one or any combination of Examples 17 through 29 to optionally include forming stackable casing frame including injection molding the stackable casing frame around the first rigid current collector.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A bipolar battery assembly, comprising:
   a first stackable casing frame;
   a first rigid current collector comprising a conductive silicon substrate, the first rigid current collector including at least one surface having a first active material conductivity type located thereon;
   a second rigid current collector comprising a conductive silicon substrate, the second rigid current collector including at least one surface having a second active material conductivity type located thereon, the second active material conductivity type corresponding to a battery electrode polarity opposite the first active material conductivity type;
   a first electrolyte region defined at least in part by the stackable casing frame, and the first and second rigid current collectors; and
   a first seal located along the surface of the first rigid current collector at a perimeter nearby the first active material and a second seal located along the surface of the second rigid current collector at a perimeter nearby the second active material, the first and second seals configured to provide a liquid-tight enclosure for the first electrolyte region;
   wherein at least one of the first or second rigid current collectors comprises a bipolar battery plate having the first active material conductivity type on a first surface, and having the second active material conductivity type on a second surface opposite the first surface.

2. The bipolar battery assembly of claim 1, wherein the rigid current collectors comprise silicon wafer substrates.

3. The bipolar battery assembly of claim 1, comprising a second stackable casing frame and a third rigid current collector;
   wherein the bipolar battery assembly comprises a series arrangement of cells defined by the first, second, and third rigid current collectors, the series arrangement established at least in part by physically stacking the stackable casing frames; and
   wherein the second and third rigid current collectors, along with the second stackable casing frame define a second electrolyte region, the second electrolyte region fluidically isolated from the first electrolyte region at least in part by at least one of the first and second seals.

4. The bipolar battery assembly of claim 3, wherein the stackable casing frames are fused together along an outer perimeter of the stackable casing frames.

5. The bipolar battery assembly of claim 1, wherein the first and second seals comprise compressible plastic seals shaped to follow a perimeter of the current collectors and anchored to the current collectors using an adhesive applied along the edge of the current collectors to provide a barrier to an electrolyte located in the first electrolyte region.

6. The bipolar battery assembly of claim 1, wherein the first and second seals comprise compressible plastic seals and adhesive seals configured to provide the liquid-tight enclosure for the first electrolyte region;
   wherein the compressible plastic seals and associated adhesive seals include materials chemically compatible with the first active material, the second active material, and an electrolyte located in the first electrolyte region of the bipolar battery assembly.

7. The bipolar battery assembly of claim 1, wherein the first and second seals comprise metallized seals configured to provide the liquid-tight enclosure for the first electrolyte region;
   wherein the metalized seals include materials substantially not corroded by a battery chemistry of the sealed bipolar battery assembly.

8. The bipolar battery assembly of claim 1, wherein the first and second seals comprise metallized seals configured to provide the liquid-tight enclosure for the first electrolyte region, the metallized seals bounded by the perimeter of the current collectors and the active materials.

9. The bipolar battery assembly of claim 1, wherein the first and second seals comprise melted seals configured to provide the liquid-tight enclosure for the first electrolyte region, the melted seals including melt regions comprising a portion of the current collectors and a portion of the stackable casing frame, the melt regions isolating adjacent cells in the sealed battery assembly from each other and from the environment around the sealed battery assembly.

10. The bipolar battery assembly of claim 1, wherein the first and second seals comprise knife-edge seals configured to provide the liquid-tight enclosure for the first electrolyte region, the knife-edge seals comprising a portion of the current collector and a compressible plastic seal.

11. The bipolar battery assembly of claim 1, wherein the first and second current collectors are fused with the stackable casing frame using an ultrasonic weld.

12. The bipolar battery assembly of claim 1, wherein the casing frame is symmetric in cross section about at least one axis.

13. The bipolar battery assembly of claim 1, wherein the casing frame is configured to be asymmetric in cross section about at least one axis to define an asymmetric cup configuration.

14. The bipolar battery assembly of claim 13, wherein the casing frame is configured to follow an outer perimeter of one of the current collectors and includes a flange extending from at least one surface.

15. A method, comprising:
forming a bipolar battery plate and casing assembly comprising a first stackable casing frame coupled to a first rigid current collector comprising a conductive silicon substrate, the first rigid current collector including a first surface having a first active material conductivity type located thereon and a second surface opposite the first surface having a second active material conductivity type located thereon, the second active material conductivity type corresponding to a battery electrode polarity opposite the first active material conductivity type, including:
forming a first seal located along the surface of the first rigid current collector at a perimeter nearby the first active material, the first seal configured to provide a liquid-tight enclosure for a first electrolyte region when the first stackable casing frame and the first rigid current collector are stacked with a second stackable casing frame and a second rigid current collector comprising a conductive silicon substrate;
wherein the first electrolyte region is defined at least in part by the first rigid current collector, the second rigid current collector, and the first stackable casing frame.

16. The method of claim 15, comprising forming a battery assembly including a second stackable casing frame and a third rigid current collector, the forming including physically stacking the first and second stackable casing frames to provide a series arrangement of cells defined by the first, second, and the third rigid current collector;
wherein the second and third rigid current collectors, along with the second stackable casing frame define a second electrolyte region, the second electrolyte region fluidically isolated from the first electrolyte region at least in part by the first seal configured to provide a liquid-tight enclosure for the first electrolyte region.

17. The method of claim 16, comprising fusing the first and second stackable casing frames together along an outer perimeter.

18. The method of claim 15, wherein the first seal comprises a compressible plastic seal shaped to follow a perimeter of the first rigid current collector and anchored to the first rigid current collector using an adhesive applied along the edge of the first rigid current collector to provide a barrier to an electrolyte located in the first electrolyte region.

19. The method of claim 15, wherein the first seal comprises a compressible plastic seal and adhesive seal configured to provide the liquid-tight enclosure for the first electrolyte region;
wherein the compressible plastic seal and associated adhesive seal include a material chemically compatible with the first active material and an electrolyte located in the first electrolyte region of the bipolar battery assembly.

20. The method of claim 15, comprising forming metallized seals configured to provide the liquid-tight enclosure for the first electrolyte region;
wherein the metalized seals include a material substantially not corroded by a battery chemistry of the sealed bipolar battery assembly.

21. The method of claim 15, wherein the first seal comprises a metallized seal configured to provide the liquid-tight enclosure for the first electrolyte region, the metallized seal bounded by the perimeter of the first rigid current collector and the first active material.

22. The method of claim 15, wherein the first seal comprises a melted seal configured to provide the liquid-tight enclosure for the first electrolyte region, the melted seal including a melt region comprising a portion of the first rigid current collector and a portion of the first stackable casing frame, the melt region isolating adjacent cells in the bipolar battery assembly from each other and from the environment around the bipolar battery assembly when the first stackable casing frame is stacked with another casing frame.

23. The method of claim 15, wherein the first seal comprises a knife-edge seal configured to provide the liquid-tight enclosure for the first electrolyte region, the knife-edge seal comprising a portion of the current collector and a compressible plastic seal.

24. The method of claim 15, comprising fusing the first rigid current collector with the first stackable casing frame using an ultrasonic weld.

25. The method of claim 15, wherein the first seal comprises a welded seal to provide the liquid-tight enclosure for the first electrolyte region.

26. The method of claim 25, wherein the method comprises forming the welded seal using hot-plate welding.

27. The method of claim 15, wherein forming the first stackable casing frame includes molding the stackable casing frame.

28. The method of claim 27, wherein the forming the first stackable casing frame includes injection molding the first stackable casing frame around the first rigid current collector.

29. The method of claim 15, wherein the first and second current collectors comprise silicon wafer substrates.

* * * * *